(12) United States Patent
Pierce et al.

(10) Patent No.: US 11,132,212 B2
(45) Date of Patent: Sep. 28, 2021

(54) PLATFORM AND INTERFACE FOR PROVIDING USER ASSISTANCE IN A COMPUTING SYSTEM

(71) Applicant: Samsung Electronics Co., Ltd., Gyeonggi-Do (KR)

(72) Inventors: Jeffrey S. Pierce, Sunnyvale, CA (US); Ranhee Chung, San Francisco, CA (US); Dane Mason, San Francisco, CA (US)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 1018 days.

(21) Appl. No.: 15/712,376

(22) Filed: Sep. 22, 2017

(65) Prior Publication Data
US 2018/0225132 A1    Aug. 9, 2018

Related U.S. Application Data

(60) Provisional application No. 62/456,015, filed on Feb. 7, 2017.

(51) Int. Cl.
| | | |
|---|---|---|
| *G06F 9/451* | (2018.01) | |
| *G06F 3/0481* | (2013.01) | |
| *G06N 5/02* | (2006.01) | |
| *G06F 3/14* | (2006.01) | |
| *G06F 3/0488* | (2013.01) | |
| *G06F 9/44* | (2018.01) | |

(Continued)

(52) U.S. Cl.
CPC ............ *G06F 9/453* (2018.02); *G06F 3/0488* (2013.01); *G06F 3/04817* (2013.01); *G06F 3/1423* (2013.01); *G06N 5/025* (2013.01); *G06F 9/44* (2013.01); *G06F 16/9535* (2019.01); *H04W 4/029* (2018.02)

(58) Field of Classification Search
CPC .... G06F 9/453; G06F 3/1423; G06F 3/04817; G06F 3/04883; G06F 9/44; G06F 16/9535; G06F 3/0488; G06N 5/025; H04W 4/029
See application file for complete search history.

(56) References Cited

U.S. PATENT DOCUMENTS

| | | |
|---|---|---|
| 8,571,580 B2 | 10/2013 | Altman et al. |
| 8,725,175 B2 | 5/2014 | Altman et al. |
| 9,008,644 B2 | 4/2015 | Papakipos et al. |

(Continued)

FOREIGN PATENT DOCUMENTS

| | | |
|---|---|---|
| KR | 20090120549 A | 11/2009 |
| KR | 20110107001 A | 9/2011 |
| WO | 2018124846 A1 | 5/2018 |

OTHER PUBLICATIONS

WIPO Appln. PCT/KR2018/000400, Written Opinion, dated Apr. 20, 2018, 7 pg.

(Continued)

*Primary Examiner* — Roberto Borja
(74) *Attorney, Agent, or Firm* — Cuenot, Forsythe & Kim, LLC

(57) ABSTRACT

Providing assistance using a device can include determining, using a processor, an application that is currently executing and displayed by the device and determining, using the processor, information that accelerates user interaction with the application. The information can be displayed on the device as application-specific assistance.

24 Claims, 10 Drawing Sheets

(51) Int. Cl.
*H04W 4/029* (2018.01)
*G06F 16/9535* (2019.01)

(56) References Cited

U.S. PATENT DOCUMENTS

| | | | |
|---|---|---|---|
| 9,008,691 B2 | 4/2015 | Busch | |
| 9,037,485 B2 | 5/2015 | Fu et al. | |
| 9,152,106 B2 | 10/2015 | Yamaguchi et al. | |
| 9,154,561 B2 | 10/2015 | Oh | |
| 9,222,016 B2 | 12/2015 | Namba et al. | |
| 9,253,616 B1 | 2/2016 | Haney | |
| 9,338,651 B2 | 5/2016 | Tatavarty et al. | |
| 9,483,164 B2 | 11/2016 | Louch et al. | |
| 2010/0064244 A1* | 3/2010 | Kilpatrick, II | G06F 1/1649 715/773 |
| 2013/0076591 A1 | 3/2013 | Sirpal et al. | |
| 2013/0102283 A1 | 4/2013 | Lau et al. | |
| 2014/0047334 A1* | 2/2014 | Nouard | G06Q 30/0185 715/705 |
| 2014/0101535 A1 | 4/2014 | Kim et al. | |
| 2014/0164972 A1 | 6/2014 | Lee | |
| 2015/0128046 A1* | 5/2015 | Cormican | H04N 21/23424 715/720 |
| 2015/0181380 A1 | 6/2015 | Altman et al. | |
| 2015/0339008 A1* | 11/2015 | Lee | G06F 3/0488 715/771 |
| 2016/0021081 A1 | 1/2016 | Caceres et al. | |
| 2016/0080904 A1 | 3/2016 | Johnson et al. | |
| 2016/0164984 A1* | 6/2016 | Chuchro | H04L 67/02 709/224 |
| 2016/0179236 A1 | 6/2016 | Shin et al. | |
| 2016/0247197 A1 | 8/2016 | Morse et al. | |
| 2016/0360336 A1* | 12/2016 | Gross | H04M 1/72403 |
| 2017/0235582 A1* | 8/2017 | Ramirez | G06F 3/0482 715/708 |
| 2018/0067959 A1* | 3/2018 | Sorvillo | G06F 16/156 |

OTHER PUBLICATIONS

WIPO Appln. PCT/KR2018/000400, International Search Report, dated Apr. 20, 2018, 3 pg.

El Koury, R., "Chatting with Google: The many ways Assistant Replaces or Augments OK Google, Google Now, and Now on Tap," Sep. 22, 2016, [online] AndroidPolice, Illogical Robot LLC © 2009-2016 [retrieved Sep. 23, 2016], retrieved from the Internet: <http://www.androidpolice.com/2016/09/22/chatting-with-google-ways-assistant-replaces-augments-ok-google-now-on-tap/>, 21 pg.

Murph, D., "Kyocera Echo Review," Apr. 13, 2011 [online] Engadget, AOL, Inc. © 2016, [retrieved Sep. 23, 2016], retrieved from the Internet: <https://www.engadget.com/2011/04/13/kyocera-echo-review/>, 8 pg.

Franklin, E., Sony Tablet P Review,> Mar. 8, 2012, [online] CBS Interactive Inc., [retrieved Sep. 23, 2016], retrieved from the Internet: <http://www.cnet.com/products/sony-tablet-p/review/>, 6 pg.

Betters, E., What is Google Assistant, How does it work, and when can you use it?> Sep. 21, 2016 [online] Pocket-int Ltd. © 2003-2013 [retrieved Sep. 23, 2016], retrieved from the Internet: <http://www.pocket-lint.com/news/137722-what-is-google-assistant-how-does-it-work-and-which-devices-offer-it>, 10 pg.

EP Appln. No. EP18750663.9, Extended European Search Report, dated Jun. 3, 2020, 19 pg.

* cited by examiner

PLATFORM AND INTERFACE FOR PROVIDING USER ASSISTANCE IN A COMPUTING SYSTEM

CROSS-REFERENCE TO RELATED APPLICATIONS

This application claims the benefit of U.S. Provisional Patent Application No. 62/456,015 filed on Feb. 7, 2017, which is fully incorporated herein by reference.

TECHNICAL FIELD

This disclosure relates to a platform and interface for providing user assistance within a computing system.

BACKGROUND

Some computing systems are capable of providing a user with general assistance. General assistance refers to information and/or actions that are helpful to a user in performing various activities. General assistance is typically determined by the computing system from an analysis of the user's general context. The user's general context includes information such as the time of day, the user's location, and the user's previous behavioral patterns. Once determined, the general assistance can be presented to the user. Other computing systems are capable of providing a user with application-content-specific assistance. Applicant-content-specific assistance refers to information and/or actions that are determined from an analysis of content that the user is viewing on the computing system.

Typically, the assistance platforms and interfaces used to provide general assistance have been completely separate and distinct from the systems and interfaces used to provide application-content-specific assistance to users.

SUMMARY

One or more embodiments are directed to methods of providing assistance using a device. In one aspect, a method can include determining, using a processor, an application that is currently executing and displayed by the device, determining, using the processor, information that accelerates user interaction with the application, and displaying the information on the device as application-specific assistance.

One or more embodiments are directed to systems for providing assistance. In one aspect, the system includes a memory configured to store instructions, a first display, and a processor coupled to the memory and the first display. The processor, in response to executing the instructions, is configured to initiate operations for providing assistance. The operations can include determining an application that is currently executing and displayed by the first display, determining information that accelerates user interaction with the application, and displaying the information as application-specific assistance.

One or more embodiments are directed to computer program products for providing assistance. In one aspect, a computer program product includes a computer readable storage medium having program code stored thereon. The program code is executable by a processor to perform executable operations. The executable operations can include determining an application that is currently executing and displayed by a device, determining information that accelerates user interaction with the application, displaying the information on the device as application-specific assistance.

One or more embodiments are directed to a device that is capable of providing assistance. In one aspect, the device includes a display unit and a processor coupled to the display unit. The processor is configured to control the display unit to display an application that is currently executing and information associated with the application that accelerates user interaction with the application.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

Figure 1:
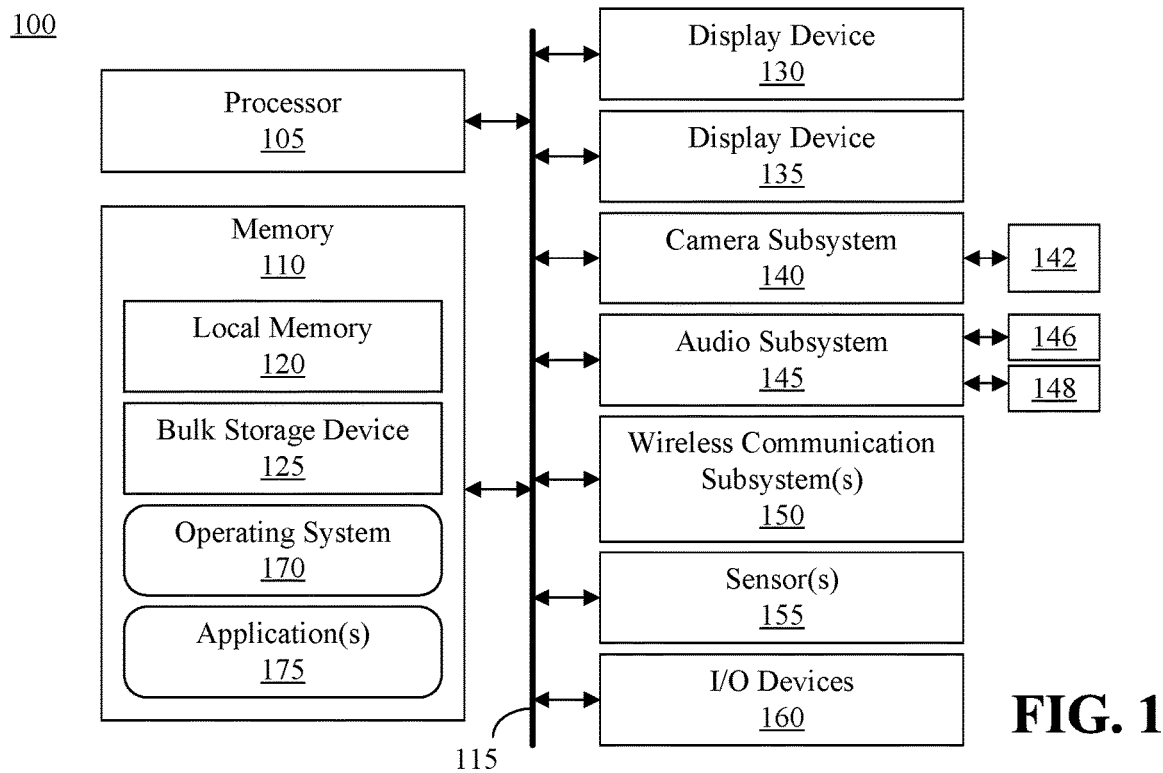
FIG. 1 illustrates an example device for use with one or more of the embodiments described within this disclosure.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to providing assistance. One or more embodiments described within this disclosure are directed to providing one or more different types of assistance to a user of a device. In particular embodiments, a user interface (UI) is provided that is operative on a device with one or more displays to provide assistance. Some devices, e.g., dual-display devices and/or multi-display devices, utilize one display as a primary display and another display as a secondary display. The primary display is capable of providing the user with the primary means of interaction with the home screen of the device and one or more applications of the device. The secondary display is capable of providing other functions including displaying assistive content. In an illustrative example, the device is capable of selecting the assistive content based upon the user's current context and displaying the assistive content on the secondary display automatically.

Typically, the assistance platforms and interfaces used to provide general assistance have been completely separate and distinct from the systems and interfaces used to provide application-content-specific assistance to users. The user is tasked with first determining which type of assistance may be useful or desired. Subsequently, the user then must manually request a particular type of assistance from the system. For example, a conventional device is capable of providing general assistance in response to a user gesture received while the home screen is displayed.

The use of a primary display and a secondary display differs from other devices, e.g., mobile or portable devices, that utilize two or more displays to provide a larger desktop or home screen. The multiple displays in such devices are configured to act as a single, larger display to show more icons or more executing applications at the same time. By using multiple displays as a single, larger display, more space may be allocated to a single application that is executing. Thus, rather than utilize the multiple displays to provide a larger desktop or home screen, the various embodiments disclosed herein are capable of utilizing the displays based upon designated or assigned roles such as primary and secondary.

One or more embodiments integrate different types of assistance by providing these different types of assistance through a single UI. The user is able to navigate between the different types of assistance provided using the UI. Examples of the different types of assistance that may be provided include general assistance, application-specific assistance, and application-content-specific assistance. These different types of assistance aid the user in performing a current task or a next (e.g., predicted or estimated) task. In particular embodiments, the type of assistance that is provided depends upon the current context that is detected by the device as the different types of assistance are capable of providing the user with different types of content.

As defined within this disclosure, the term "general assistance" means assistance provided by a computing system, e.g., a device, that is dependent upon a current context of the user and/or the device. The current context of can include the current location of the user and/or device, the current time of day, and patterns (e.g., historical patterns) of application use in the device by the user. While general assistance takes into account historical patterns of application usage, general assistance is independent of, i.e., does not depend upon, the particular application that is currently executing and displayed on the primary display of the device. Thus, the current context used to provide and/or invoke general assistance does not include the application that is currently executing and displayed on the primary display of the device.

General assistance helps the user by providing information and/or shortcuts to operations that are relevant to the user's next task. General assistance is provided based on the assumption that the user has not yet started a new task or is in the process of switching from one task to a new task. In this manner, as noted, the assistance that is provided is independent of the application that is currently executing and/or displayed on the primary display of the device.

As defined within this disclosure, the term "application-specific assistance" means assistance provided by a computing system, e.g., a device, that depends, at least in part, upon the particular application that is currently executing in the device and that is currently displayed on a display of the device. In particular embodiments, the display is the primary display. In one or more embodiments, the particular display that is designated as the primary display may change during operation of the device. In an example, the display that is displaying an executing application (e.g., in full screen) may be designated as the primary display when the other display of the device is not displaying an executing application. Application-specific assistance is determined independently of, e.g., without reference to, content displayed within the application.

As an illustrative and non-limiting example, a user may open a first application on the primary display of the device. In response, the device provides application-specific assistance on the secondary display of the device. Part of the application-specific assistance is a link to a second application that the user often uses concurrently with the first application. In response to a user selection of the link, the device executes the second application and displays the executing second application on the secondary display. Subsequently, the user closes the first application on the primary display. In that case, in response to the closing of the first application, the device is capable of automatically displaying application-specific assistance for the second application on the primary display (e.g., what was the primary display). In this example, the role of primary display and secondary display changes automatically based upon which of the displays is currently displaying an executing application.

As defined within this disclosure, the term "application-content-specific assistance" means assistance provided by a computing system, e.g., a device, that depends, at least in part, upon the content that is displayed by the application on the primary display and/or is currently viewable on the primary display. In this regard, application-content-specific assistance need not depend, e.g., is independent of, the particular application that is displaying the content. The application-content-specific assistance may depend entirely upon the content displayed by the application. As an illustrative and non-limiting example, a user may view content within an electronic mail message and same or similar content within a browser. The device is capable of providing the same application-content-specific assistance in each of these two different cases since the content displayed or presented by the applications is the same or similar despite the application presenting the content being different.

In one or more embodiments, the device is capable of providing one or more or any combination of the different types of assistance in a proactive manner, e.g., automatically. For example, the device is capable of detecting particular conditions and, in response to detecting the conditions, provide one or more of the different types of assistance described herein. In particular embodiments, the different types of assistance provided are selected and provided in response to detecting conditions relating to the current context of the user and/or whether an application is executing and displayed on a primary display of the device. For example, the device is capable of selecting one or more types of assistance and providing the selected types of assistance to the user via the device in response to parameters of the general context of the user including, but not limited to, the current, previous, and estimated future location (e.g., based upon historical movement patterns) of the user and/or device; the current time of day; the user's usage patterns of the device relating to applications, shortcuts, and information access; the user's calendar; weather; and current and/or historical traffic patterns.

In one or more embodiments, the current context includes or specifies whether an application is executing and is displayed on the primary display and, if so, the particular application that is displayed. In particular embodiments, in the case where an application is executing and displayed on the primary display, the current context can specify the name or identity of the particular application that is executing. In particular embodiments, the current context can specify whether content is loaded and/or displayed by the application. A current context can specify other types of information as described below in greater detail.

In one or more embodiments, the device is capable of providing integrated access to general assistance, to application-specific assistance, and/or to application-content-specific assistance. The device is capable of providing integrated access to any pair of the three different types of assistance described and/or to all three different types of assistance. The assistance may be integrated by displaying one or more or all of the different types of assistance using a common UI and/or assistance platform. The common UI, for example, is capable of allowing a user to navigate among different types of assistance. The common UI can be displayed using a secondary display or a plurality of secondary displays of the device, on displays of other devices that are communicatively linked with the device, on a single display, using virtual displays, or other suitable displays.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a device 100 for use with one or more embodiments described within this disclosure. Device 100 includes at least one processor 105. Processor 105 is coupled to memory 110 through interface circuitry 115. Device 100 stores computer readable instructions (also referred to as "program code") within memory 110. Memory 110 is an example of computer readable storage media. Processor 105 executes the program code accessed from memory 110 via interface circuitry 115.

Memory 110 includes one or more physical memory devices such as, for example, a local memory 120 and a bulk storage device 125. Local memory 120 is implemented as non-persistent memory device(s) generally used during actual execution of the program code. Examples of local memory 120 include random access memory (RAM) and/or any of the various types of RAM that are suitable for use by a processor during execution of program code. Bulk storage device 125 is implemented as a persistent data storage device. Examples of bulk storage device 125 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 100 may also include one or more cache memories (not shown) that provide temporary storage of at least some program code in order to reduce the number of times program code must be retrieved from a bulk storage device during execution.

Examples of interface circuitry 115 include, but are not limited to, an input/output (I/O) subsystem, an I/O interface, a bus system, and a memory interface. For example, interface circuitry 115 may be implemented as any of a variety of bus structures and/or combinations of bus structures including a memory bus or memory controller, a peripheral bus, an accelerated graphics port, and a processor or local bus.

In one or more embodiments, processor 105, memory 110, and/or interface circuitry 115 are implemented as separate components. In one or more embodiments, processor 105, memory 110, and/or interface circuitry 115 are integrated in one or more integrated circuits. The various components in device 100, for example, can be coupled by one or more communication buses or signal lines (e.g., interconnects and/or wires). In particular embodiments, memory 110 is coupled to interface circuitry 115 via a memory interface, e.g., a memory controller (not shown).

Device 100 may include one or more displays. In the example of FIG. 1, device 100 is a multi-display device. More particularly, device 100 is implemented as a dual-display device having a display 130 and a display 135. Display 130 may be the primary display, while display 135 may be the secondary display. In particular embodiments, display 130 and/or display 135 are implemented as touch-sensitive or touchscreen displays capable of receiving touch input from a user. A touch sensitive display and/or a touch-sensitive pad is capable of detecting contact, movement, gestures, and breaks in contact using any of a variety of available touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 100 may include a camera subsystem 140. Camera subsystem 140 can be coupled to interface circuitry 115 directly or through a suitable input/output (I/O) controller. Camera subsystem 140 can be coupled to an optical sensor 142. Optical sensor 142 may be implemented using any of a variety of technologies. Examples of optical sensor 142 can include, but are not limited to, a charged coupled device (CCD) or a complementary metal-oxide semiconductor (CMOS) optical sensor. Camera subsystem 140 and optical sensor 142 are capable of performing camera functions such as recording images and/or recording video.

Device 100 may include an audio subsystem 145. Audio subsystem 145 can be coupled to interface circuitry 115 directly or through a suitable input/output (I/O) controller. Audio subsystem 145 can be coupled to a speaker 146 and a microphone 148 to facilitate voice-enabled functions, such as voice recognition, voice replication, digital recording, and telephony functions.

Device 100 may include one or more wireless communication subsystems 150. Each of wireless communication subsystem(s) 150 can be coupled to interface circuitry 115 directly or through a suitable I/O controller (not shown). Each of wireless communication subsystem(s) 150 is capable of facilitating communication functions. Examples of wireless communication subsystems 150 can include, but are not limited to, radio frequency receivers and transmitters, and optical (e.g., infrared) receivers and transmitters. The specific design and implementation of wireless communication subsystem 150 can depend on the particular type of device 100 implemented and/or the communication network(s) over which device 100 is intended to operate.

As an illustrative and non-limiting example, wireless communication subsystem(s) 150 may be designed to operate over one or more mobile networks (e.g., GSM, GPRS, EDGE), a WiFi network which may include a WiMax network, a short range wireless network (e.g., a Bluetooth network), and/or any combination of the foregoing. Wireless communication subsystem(s) 150 can implement hosting protocols such that device 100 can be configured as a base station for other wireless devices.

Device 100 may include one or more sensors 155. Each of sensors 155 can be coupled to interface circuitry 115 directly or through a suitable I/O controller (not shown). Examples of sensors 155 that can be included in device 100 include, but are not limited to, a motion sensor, a light sensor, and a proximity sensor to facilitate orientation, lighting, and proximity functions, respectively, of device 100. Other examples of sensors 155 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 100 in 3-dimensions, and an altimeter (e.g., an integrated circuit) capable of providing data indicating altitude.

Device 100 further may include one or more input/output (I/O) devices 160 coupled to interface circuitry 115. I/O devices 160 may be coupled to device 100, e.g., interface circuitry 115, either directly or through intervening I/O controllers (not shown). Examples of I/O devices 160 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 100 to become coupled to other systems, computer systems, remote printers, and/or remote storage devices through intervening private or public networks. Modems, cable modems, Ethernet interfaces, and wireless transceivers not part of wireless communication subsystem(s) 150 are examples of different types of network adapters that may be used with device 100. One or more of I/O devices 160 may be adapted to control functions of one or more or all of sensors 155 and/or one or more of wireless communication subsystem(s) 150.

Memory 110 stores program code. Examples of program code include, but are not limited to, routines, programs, objects, components, logic, and other data structures. For purposes of illustration, memory 110 stores an operating system 170 and application(s) 175. Operating system 170 and/or applications 175 can include, for example, assistance platform program code. In one or more embodiments, the assistance platform program code, when executed, is capable of causing device 100 and/or other devices that may be communicatively linked with device 100 to perform the various operations described herein. Memory 110 is also capable of storing data, whether data utilized by operating system 170, data utilized by application(s) 175, data received from user inputs, data generated by one or more or all of sensor(s) 155, data received and/or generated by camera subsystem 140, data received and/or generated by audio subsystem 145, and/or data received by I/O devices 160.

In an aspect, operating system 170 and application(s) 175, being implemented in the form of executable program code, are executed by device 100 and, more particularly, by processor 105, to perform the operations described within this disclosure. As such, operating system 170 and application(s) 175 may be considered an integrated part of device 100. Further, it should be appreciated that any data and/or program code used, generated, and/or operated upon by device 100 (e.g., processor 105) are functional data structures that impart functionality when employed as part of device 100.

Memory 110 is capable of storing other program code. Examples of other program code include, but are not limited to, instructions that facilitate communicating with one or more additional devices, one or more computers and/or one or more servers; graphic user interface (GUI) and/or UI processing; sensor-related processing and functions; phone-related processes and functions; electronic-messaging related processes and functions; Web browsing-related processes and functions; media processing-related processes and functions; GPS and navigation-related processes and functions; security functions; and camera-related processes and functions including Web camera and/or Web video functions.

Device 100 further can include a power source (not shown). The power source is capable of providing electrical power to the various elements of device 100. In an embodiment, the power source is implemented as one or more batteries. The batteries may be implemented using any of a variety of known battery technologies whether disposable (e.g., replaceable) or rechargeable. In another embodiment, the power source is configured to obtain electrical power from an external source and provide power (e.g., DC power) to the elements of device. In the case of a rechargeable battery, the power source further may include circuitry that is capable of charging the battery or batteries when coupled to an external power source.

Device 100 is provided for purposes of illustration and not limitation. A device and/or system configured to perform the operations described herein may have a different architecture than illustrated in FIG. 1. The architecture may be a simplified version of the architecture described in connection with FIG. 1 that includes a memory capable of storing instructions and a processor capable of executing instructions. In this regard, device 100 may include fewer components than shown or additional components not illustrated in FIG. 1 depending upon the particular type of device that is implemented. For example, device 100 may include a single display. In addition, the particular operating system and/or application(s) included may vary according to device type as may the types of I/O devices included. Further, one or more of the illustrative components may be incorporated into, or otherwise form a portion of, another component. For example, a processor may include at least some memory.

Device 100 may be implemented as a data processing system, a communication device, or other suitable system that is suitable for storing and/or executing program code. Example implementations of device 100 may include, but are not to limited to, a smart phone or other mobile device or phone, a wearable computing device, a computer (e.g., desktop, laptop, or tablet computer), a television or other appliance with a display, a computer system included and/or embedded in another larger system such as an automobile, a virtual reality system, or an augmented reality system.

Figure 2:
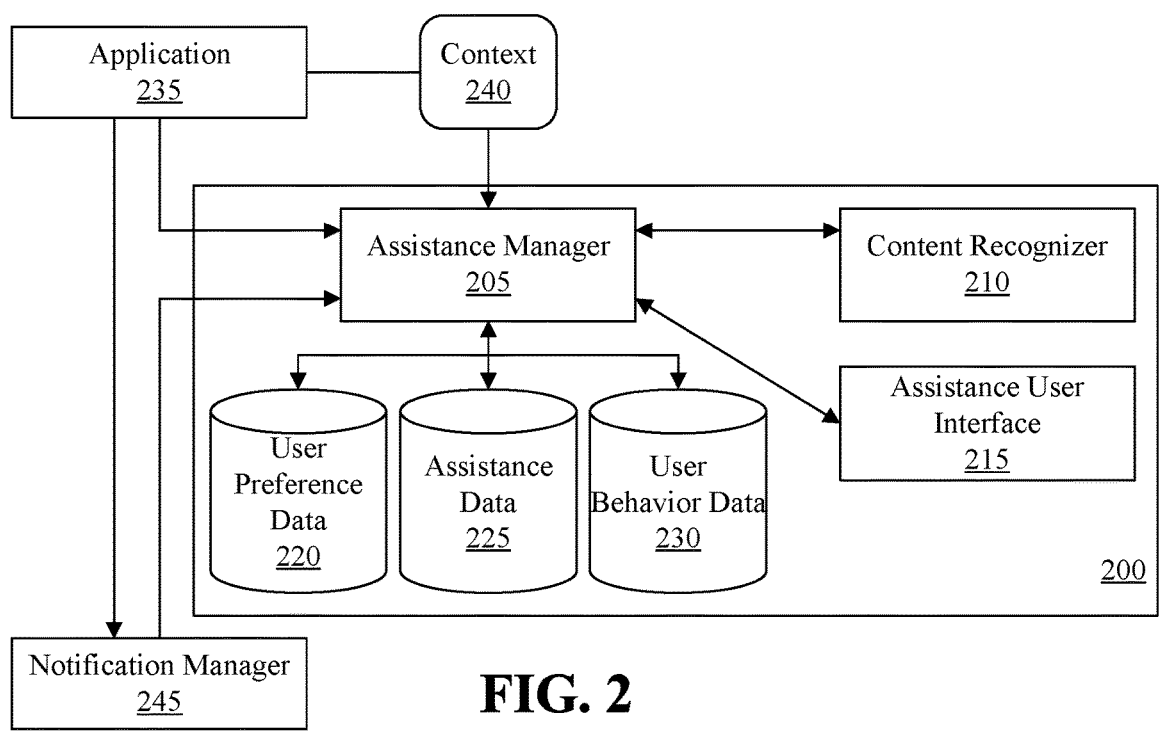
FIG. 2 illustrates an example assistance platform that is executable by the device of FIG. 1 for providing assistance.

FIG. 2 illustrates an example assistance platform 200 that is executable by device 100 for providing assistance. In one or more embodiments, assistance platform 200 is integrated into operating system 170 of device 100. In one or more other embodiments, assistance platform 200 is implemented as a stand-alone system, e.g., as an application 175 or a plurality of applications capable of executing cooperatively, within device 100.

In the example of FIG. 2, assistance platform 200 is capable of interacting with one or more applications 235 and notification manager 245. As pictured, assistance platform 200 includes an assistance manager 205, a content recognizer 210, and an assistance UI 215. Assistance platform 200 further can include one or more data structures stored in memory such as user preference data 220, assistance data 225, and user behavior data 230.

In one or more embodiments, assistance manager 205 is capable of providing an application programming interface (API) that is exposed to one or more of application(s) 235 and/or to notification manager 245. Application 235 is capable of accessing the API and providing assistance manager 205 with a context 240 for a user. Context 240 may be current context. Application 235, for example, is capable of accessing one or more sensors 155 of device 100 and generating context 240 from the sensor data, application state data, and/or operating system state data. Examples of the information specified or included in context 240 can include, but are not limited to, one or more or any combination of the following: the current, previous, and estimated future location of the user and/or device (e.g., based upon historical movement patterns); the current time of day; the user's usage patterns of the device relating to applications (e.g., which applications are used most frequently, when used, and where used), shortcuts, and information access; the user's calendar; weather; and current and/or historical traffic patterns.

In one or more embodiments, context 240 is capable of specifying whether an application is executing and displayed on the primary display of device 100. Further, in the case where an application is executing and displayed on the primary display of device 100, context 240 can specify the name or identity of the particular application that is executing. In particular embodiments, context 240 can specify whether content is loaded and/or displayed by the application. As another illustrative example, if application 235 is an electronic mail application, context 240 can specify which people the user of device 100 contacts or contact with the greatest frequency.

While context 240 is shown as being provided by an application 235 in FIG. 2, in one or more embodiments, context 240 can originate and be provided from one or more different sources individually or in combination (e.g., from two or more sources concurrently). For example, context 240 can be provided by operating system 170 of device 100. Operating system 170, for example, is capable of providing context 240 indicating which applications the user (e.g., device 100) uses or executes most frequently and/or which applications the user typically uses concurrently with another application that is currently executing. In another example, context 240 can be determined directly by assistance platform 200. Assistance manager 205, for example, is capable of determining context 240 by accessing sensors 155, I/O devices 160, interacting with operating system 170 and/or application(s) 175. In one or more embodiments, assistance platform 200, e.g., assistance manager 205, is capable of tracking (e.g., storing, analyzing, and determining) the types of assistance the user uses most often, e.g., frequency of use of the different types of assistance, so that the UI generated by assistance platform 200 can prioritize frequently used assistance.

In particular embodiments, application 235 is further capable of informing assistance manager 205 about the particular types of data, e.g., object types, upon which application 235 is capable of operating and/or is capable of receiving as input. As illustrative and non-limiting examples, if application 235 is a browser, application 235 is capable of informing assistance manager 205 that application 235 is capable of receiving and/or operating on object types such as URLs, Webpages, text files, or other object types.

In particular embodiments, an application such as application 235 is also capable of informing assistance manager 205 about which application-specific assistance to offer. For example, application 235 is capable of accessing the API provided by assistance manager 205 to inform assistance manager 205 of which shortcuts to content and/or actions within application 235 to offer as assistance. In the case where application 235 is an electronic mail application, for example, application 235 can inform assistance manager 205 that the following shortcuts may be offered as application-specific assistance: a shortcut for each account in the electronic mail application, a shortcut to draft a new message, shortcuts for frequent contacts; a shortcut for launching a web browser, shortcuts for launching particular Web pages.

In one or more embodiments, content recognizer 210 is capable of performing text processing functions on content that is recognized and/or displayed on a display of device 100. In particular embodiments, the content may be displayed within an application that is executing in device 100 and/or is displayed on a display of device 100. In particular embodiments, content recognizer 210 is capable of performing Natural Language Processing (NLP). NLP is a field of computer science, artificial intelligence, and computational linguistics that implements computer processes to facilitate interactions between computer systems and human (natural) languages. NLP enables computers to derive computer-understandable meaning from natural language input. The International Organization for Standardization (ISO) publishes standards for NLP. An example of such a standard is ISO/TC37/SC4. As part of NLP, content recognizer 210 is capable of performing semantic analysis. Semantic analysis may follow parsing and involve extraction of context-independent aspects of a sentence's meaning, including entities, named entities, the semantic roles of entities mentioned in the sentence, and quantification information, such as cardinality, iteration, and dependency.

In one or more embodiments, user preference data 220 is capable of indicating the conditions when particular types of assistance, e.g., general assistance, application-specific assistance, and/or application-content-specific assistance, is provided. In particular embodiments, user preference data 220 is capable of indicating which display of a plurality of displays of device 100 (or of a plurality of communicatively linked devices) that each of the different types of assistance will be displayed. In one or more embodiments, user preference data 220 is capable of indicating user preferences for navigating among the different types of assistance that may be provided. For example, user preference data 220 may indicate which types of user inputs (e.g., gestures) are used to invoke each type of assistance, dismiss each type of assistance, and/or cause device 100 to navigate from displaying one type of assistance to another and/or back again.

In particular embodiments, user preference data 220 is capable of specifying which types of assistance the user is interested in receiving, e.g., for any assistance type. User preference data 220 is capable of specifying the relative importance of each type of assistance. This would allow assistant manager 205 to choose which types of assistance to show (e.g., general assistance, application-specific assistance, application-content-specific assistance). User preference data 220 is further capable of specifying how to organize and/or sort the types of assistance.

In particular embodiments, user preference data 220 can be specified manually by the user. In general, the user by providing user preference data 220, is able to explicitly indicate those items of assistance for the various types of assistance offered so that assistance platform 200 may access the user preference data 200 to provide the user with exactly the items and/or types of assistance desired by the user.

In one or more embodiments, assistance data 225 is capable specifying the types of content that may be presented for the user for each different type of assistance. For example, assistance data 225 is capable of specifying the different types of information and/or shortcuts to be displayed or that are allowed to be displayed for general assistance, for application-specific assistance, and/or for application-content-specific assistance. A shortcut refers to an object that is displayed within a UI that provides a link to executable program code. The executable program code may be an application or an executable operation of an application.

In one or more embodiments, user behavior data 230 specifies historical behavioral patterns of the user relative to device 100. For example, user behavior data 230 can specify patterns of locations visited by the user, patterns of application usage by the user, and other behavioral characteristics of the user of device 100. In particular embodiments, user behavior data 230 is capable of specifying which types of assistance the user interacts with. User behavior data 230, for example can specify frequency of interaction of the user with each different type of assistance and/or the particular conditions under which the user accesses each different type of assistance. Assistance manager 205 is capable of determining this information and persisting the data to user behavior data 230.

In an illustrative and non-limiting example, assistance manager 205 is capable of accessing user preference data 220, assistance data 225, and user behavior data 230 to provide the user with general assistance. For example, assistance manager 205 is capable of determining that no application is currently displayed on a display or on the primary display of device 100. In response to such a determination, as specified by user preference data 220, for example, assistance manager 205 is capable of displaying general assistance for the user in a display of device 100 through assistance UI 215. User preference data 220 can indicate the particular display upon which the general assistance is provided. Assistance manager 205 is capable of determining the type of assistance to be provided based upon user behavior data 230 and determining the items (e.g., information and/or shortcuts) of content to display from assistance data 225.

As another example, assistance manager 205 is capable of using a combination of user preference data 220 and user behavioral data 230 to determine particular information to be provided (e.g., stock market information, applications the user is likely to use next, and/or news headlines) and the order in which to present such information. Assistance manager 205 is capable of using assistance data 225 to provide the content for some of those types of data (e.g., current prices for stocks of interest and/or top headlines from selected news sources). For which application(s) the user is likely to use next, assistance manager 205 is capable of accessing user behavioral data 230.

In another illustrative and non-limiting example, assistance manager 205 is capable of receiving data from application 235 that indicates the object type(s) upon which application 235 is capable of operating and/or receiving as input. Further, assistance manager 205 is capable of receiving context 240 from application 235. Assistance manager 205 is also capable of receiving current notifications from notification manager 245. Assistance manager 205 is capable of determining whether an application is currently executing and whether such application is currently displayed on a display of device 100. For purposes of illustration, application 235 is an application that assistance manager 205 has determined to be currently executing and currently displayed on a display of device 100, e.g., on the primary display. Accordingly, assistance manager 205 is capable of providing application-specific assistance and/or application-content-specific assistance to the user.

As an illustrative and non-limiting example, assistance manager 205 is capable of using information about which object types the current application can act on in order to identify suitable content to include in application-specific assistance. If, for example, the currently executing application supports actions on movies, assistant manager 205 is capable of showing a list of movies the user previously saved and that the user may act on using the current application.

In another example, assistance manager 205 is capable of generating and storing a list of actions supported by one or more applications. For example, assistance manager 205 is capable of generating a list of the operations supported by installed applications as registered with assistance manager 205 via the API. Assistance manager 205 is capable of using the list of actions supported by the one or more applications (e.g., other than the currently executing application) to provide application-content-specific assistance. If, for example, the user is looking at a movie in application A, assistance manager 205 is capable of providing shortcuts from applications B, C, and D for acting on the movie shown by application A.

As noted, assistance manager 205 is capable of determining the particular display upon which assistance is provided from user preference data 220. From assistance data 225, assistance manager 205 is capable of determining the particular data items to be shown for each different type of assistance to be provided. Assistance manager 205 is capable of determining the content of the data items to be presented within the different types of assistance based upon user preference data 220 and/or user behavior data 230 and/or content recognizer 210. Appreciably, content recognizer 210 is utilized in the case where assistance manager 205 is providing application-content-specific assistance. Content recognizer 210 need not be accessed for providing general assistance or application-specific assistance.

FIGS. 3A-3H illustrate examples of general assistance. FIGS. 3A-3H show examples of views displayed by device 100 through the assistance UI of FIG. 2. In one or more embodiments, the views shown are displayed on the secondary display of device 100. For example, the primary display of device 100 is capable of displaying a home screen of device 100. Concurrently with the display of the home screen on the primary display of device 100, assistance platform 200 is capable of displaying one or more of the views illustrated in FIGS. 3A-3H on the secondary display. In particular embodiments, each of the views illustrated in FIGS. 3A-3H is displayed automatically in response to detecting a particular context or a change in the context.

In particular embodiments, assistance platform 200 is capable of providing general assistance, e.g., displaying any of the views pictured in FIGS. 3A-3H individually or in any combination, in response to determining that an application is not displayed on the primary display of the device and further detecting a particular context or a change in the context. An example scenario in which an application is not displayed on the primary display of the device is where the home screen of the device is displayed on the primary display. Accordingly, regarding the examples described below in connection with FIGS. 3A-3H, assistance platform 200 is capable of displaying the views of FIGS. 3A-3H as part of providing general assistance under the conditions described and/or also in response to determining that an application is not currently displayed on the primary display of device 100.

Figure 3A:
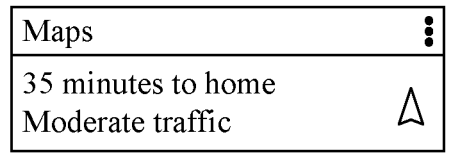
FIGS. 3A-3H illustrate examples of general assistance.

FIG. 3A illustrates an example of providing general assistance for a user that is based upon time information in a current context. In the example of FIG. 3A, travel data is considered timely and is provided as general assistance for the user. Assistance platform 200 is capable of determining the context of the user, e.g., the current time and current location of the user, to display information as general assistance that is timely. In one or more embodiments, assistance platform 200 is capable of determining that the user is likely to leave for home based upon user behavior data 230 and context 240 (e.g., current time and current location). In response to evaluating context 240 and user behavior data 230 (e.g., past travel patterns of the user) and optionally determining that no application is displayed on the primary display, assistance platform 200 displays the view illustrated in FIG. 3A.

Figure 3B:
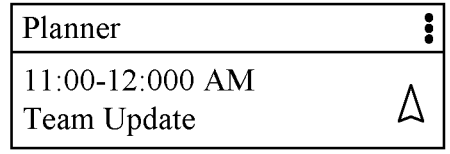

FIG. 3B illustrates another example of providing general assistance for a user that is based upon time information in a current context. In the example of FIG. 3B, calendar data is provided as general assistance to the user. Assistance platform 200 is capable of determining the context of the user, e.g., the current time, to display information as general assistance that is timely. In one or more embodiments, assistance platform 200 is capable of using context 240 in combination with calendar data for the user to determine the next meeting on the user's calendar. In response to evaluating context 240, calendar data for the user, and optionally that no application is displayed on the primary display, assistance platform 200 displays the view illustrated in FIG. 3B.

Figure 3C:
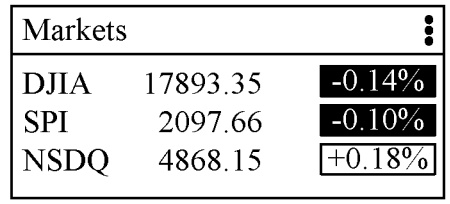

FIG. 3C illustrates an example of providing general assistance to the user that is based upon frequency of use. In the example of FIG. 3C, financial market data is provided as general assistance to the user. Assistance platform 200 is capable of determining data and/or services that the user accesses frequently or with a frequency that exceeds a threshold frequency of usage, whether computed hourly, daily, weekly, monthly, or using another suitable time metric. In one or more embodiments, assistance platform 200 determines that the user checks financial markets (e.g., visits a financial markets Webpage or accesses a financial markets application) with at least a minimum frequency based upon user behavior data 230 (e.g., application usage history). Accordingly, assistance platform 200 is capable of displaying the view pictured in FIG. 3C in response to determining that frequency of use for financial market data exceeds a threshold amount and optionally that no application is displayed on the primary display.

As another illustrative example, user preference data may specify particular data and/or services that are to be made available as part of general assistance. The user is capable of manually specifying preferences that are stored within the user preference data. For example, the user preference data can specify that financial market data is to be made available as part of the general assistance data. Accordingly, assistance platform 200 is capable of providing any data specified within the user preference data as part of general assistance.

Figure 3D:
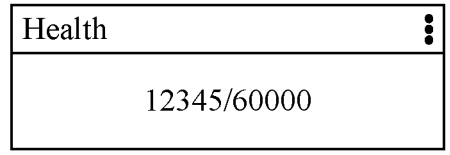

FIG. 3D illustrates another example of providing general assistance to the user that is based upon frequency of use. In the example of FIG. 3D, health data is provided as general assistance to the user. Assistance platform 200 determines that the user accesses health data, e.g., number of steps taken today compared to a daily goal, with at least a minimum frequency. Accordingly, assistance platform 200 is capable of displaying the view pictured in FIG. 3D in response to determining that the frequency of use of health data exceeds the threshold amount and that optionally no application is displayed on the primary display.

Figure 3E:
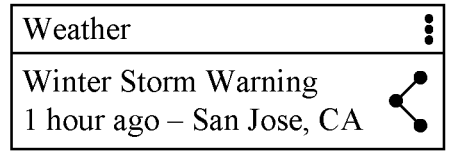

FIG. 3E illustrates an example of providing general assistance to the user that is based upon detecting data that deviates from an established norm, pattern, or range. Assistance platform 200 is capable of highlighting the detected differences as part of providing general assistance. In the example of FIG. 3E, weather data is provided as general assistance to the user. Assistance platform 200 is capable of comparing context 240, e.g., weather, with established norms stored in user behavior data 230 and/or other historical data. Accordingly, assistance platform 200 is capable of displaying the view pictured in FIG. 3E in response to determining that context 240, or a data item within context 240, is unusual, e.g., outside of an established range of normalcy, and that optionally no application is displayed on the primary display. In the example of FIG. 3E, assistance platform 200 determines that a winter storm warning, given the current context (e.g., time of year and past weather conditions for the current time of year), is unusual.

Figure 3F:
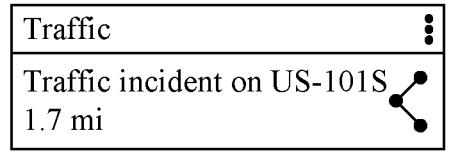

FIG. 3F illustrates another example of providing general assistance to the user that is based upon detecting data that deviates from an established norm, pattern, or range. In the example of FIG. 3F, traffic data is provided as general assistance to the user. Assistance platform 200 is capable of comparing context 240, e.g., traffic, with established norms stored in user behavior data 230 and/or data from other sources. Assistance platform 200 is capable of determining that the current traffic conditions, e.g., the occurrence of an accident, are unusual, e.g., outside of an established range of normalcy, from a comparison of context 240 with user behavior data 230. Accordingly, assistance platform 200 is capable of displaying the view pictured in FIG. 3F in response to determining that context 240, or a data item within context 240, is unusual, e.g., outside of an established range of normalcy, and that optionally no application is displayed on the primary display.

Figure 3G:
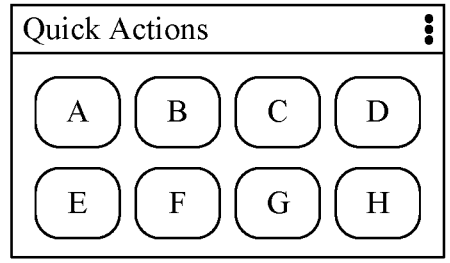

FIG. 3G illustrates an example of providing general assistance to the user where different types of assistance are provided. In one or more embodiments, assistance platform 200 determines a list of objects that the user of device 100 is likely to use next. Examples of objects that the user may use next and assistance platform 200 is capable of evaluating include, but are not limited to, applications, Web pages, or people (e.g., contacts), files (e.g., documents, pictures, spreadsheets, presentations), books, or other content. In the example of FIG. 3G, assistance platform 200 provides a link or shortcut to different objects that the user is likely to use next. Referring to FIG. 3G, each shortcut is shown as an icon labeled A-H. Each icon A-H is selectable by the user to initiate execution of an executable operation (e.g., program code) represented by the icon. The operations can include, but are not limited to, executing an application, launching a file using a suitable application, launching a Web site (e.g., a URL), or performing some other action.

Figure 3H:
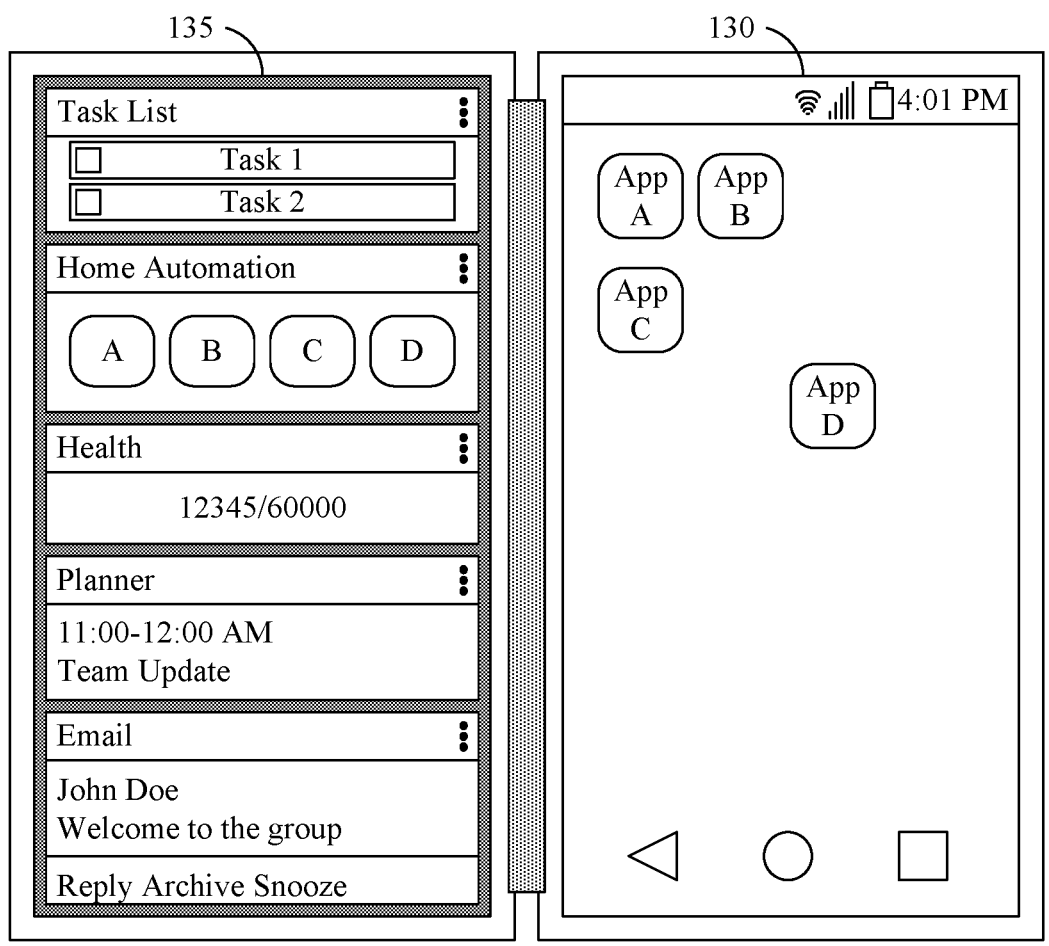

FIG. 3H illustrates an example of providing general assistance where multiple different types of assistance content are shown concurrently on a display of device 100. In the example of FIG. 3H, general assistance including a task list, home automation applications or executable operations of applications (e.g., icons A-D), health data, calendar and/or event data, and received electronic mails are shown. In the example of FIG. 3H, device 100 is implemented as a dual-display device with display 130 being the primary display and display 135 being the secondary display. As pictured, display 130 displays a home screen view for device 100. Display 135 provides the general assistance described. As discussed, the various types of general assistance described in connection with FIGS. 3A-3H can be displayed on display 135.

In one or more embodiments, assistance platform 200 is capable of providing content that is explicitly provided by applications as general assistance. For example, referring to FIG. 3H, the task list may be explicitly provided by a task management application as information that is to be used for general assistance. The task list, or a subset of the data, can be provided from the application to assistance platform 200 via the API.

In one or more embodiments, one or more of the items of information shown in FIG. 3H are obtained from active notifications for the user. An active notification is a notification that has not yet been acted on, e.g., selected or dismissed, by the user. Assistance platform 200, as previously described in connection with FIG. 2, is capable of interacting with notification manager 245 to obtain the active notifications. In one or more embodiments, assistance platform 200 is capable of presenting one or more or all of the active notifications as general assistance to the user.

In particular embodiments, assistance platform 200 is capable of displaying a subset of the active notifications. Assistance platform 200 selects the subset of active notifications from the set of all active notifications. In one or more embodiments, assistance platform 200 selects the subset of active notifications based upon preferences specified in user preference data 220 and/or in assistance data 225. User preference data 220 and/or assistance data 225 can indicate which types of active notifications should be included, if any, within general assistance. Examples can include, but are not limited to, selected tasks such as tasks with a due date for today and/or tomorrow, health data such as steps taken, next calendar event, or a list of unread electronic mail messages.

In one or more embodiments, assistance platform 200 selects the subset of notifications based upon which of the notifications are believed to be performed or accessed next by the user. In another embodiment, assistance platform 200 is capable of selecting the subset of active notifications based upon frequency of access by the user, e.g., where active notifications with frequency of access above a threshold frequency of access are selected for display or the top "N" notifications are selected where N is number that is less than the total number of active notifications. In particular embodiments, frequency of access of notifications may be specified by user behavior data 230, which can be used by assistance platform 200 for selecting the subset of notifications.

FIGS. 4A-4D illustrate examples of application-specific assistance. As generally described, application-specific assistance helps the user by providing information and/or actions that are relevant to a current task performed by the user. Application-specific assistance presumes that the user is engaged with an application that is currently executing and displayed. The application, for example, may be executing on the primary display of device 100. Application-specific assistance accelerates user interaction with the application that is executing and displayed on the primary display. Examples of information that accelerates user interaction with an application can include, but are not limited to, executable operations of the application and object types that can be received by the application as input(s). As an illustrative and non-limiting example, assistance platform 200 is capable of providing application-specific assistance to a user by providing shortcuts (e.g., links) to information relating to the application, executable operations of the application, and/or other executable operations that relate to the application and that are likely to accelerate user interaction with the application. The examples of FIGS. 4A-4D illustrate various ways in which user interaction with the application is accelerated by the application-specific assistance that is provided.

In one or more embodiments, assistance platform 200 is capable of accessing entry points of the executing application to determine the types of assistance, e.g., shortcuts, to provide as application-specific assistance. In general, an entry point refers to a location wherein control is transferred from the operating system to an application or other program code that is to execute. Accordingly, assistance platform 200 is capable of determining existing entry points for applications and utilize the entry points of an executing application to determine the types information to provide as application-specific assistance when that application is executing.

In particular embodiments, other frameworks for sharing data and/or content between applications and/or devices may be used by assistance platform 200 to determine the type of data to provide as application-specific assistance when an application is executing. In particular embodiments, applications are capable of notifying assistance platform 200 of the types of information that can and/or should be made available as application-specific assistance while the application is executing. Applications are capable of providing such information to assistance manager 205, for example, using the API exposed by assistance platform 200.

Figure 4A:
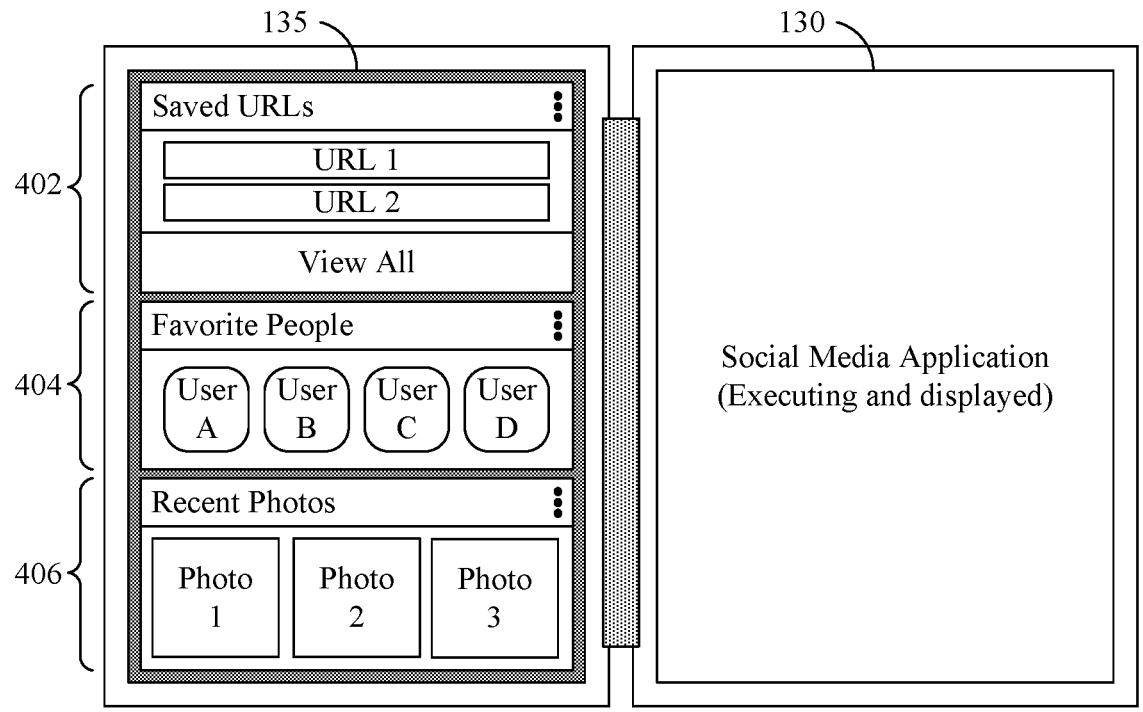
FIGS. 4A-4D illustrate examples of application-specific assistance.

FIG. 4A illustrates an example of providing application-specific assistance. As pictured in FIG. 4A, device 100 is executing an application on display 130. In the example of FIG. 4A, the application is a social media application. In one or more embodiments, device 100 automatically displays application-specific assistance on display 135. For example, in response to the social media (or other application) executing and being displayed on display 130, assistance platform 200 generates and provides application-specific assistance on display 135.

In the example of FIG. 4A, device 100 has determined various items of application-specific assistance that are provided on display 135. As pictured, in region 402 of display 135, assistance platform 200 displays one or more shortcuts corresponding to URLs. In region 404 of display 135, device 100 displays one or more shortcuts corresponding to one or more favorite persons, e.g., contacts. In region 406, assistance platform 200 displays one or more photos stored on device 100 or available to device 100. The photos may be recently taken photos or recently stored photos. Each of the items illustrated in regions 402, 404, and 406 can be displayed by assistance platform 200 as a shortcut that, when selected, causes device 100 to take appropriate action on the item for that application. For example, selection of the shortcut may cause the item represented by the shortcut to be opened within the application executing on display 130. In other examples, selection of the shortcut may initiate or start a message to a particular person, open a UI for sharing a photo represented by the selected shortcut, or open a UI for sharing a URL represented by the shortcut.

As discussed, assistance platform 200 is capable of determining the object types that can be received as input and/or operated upon by the application displayed on display 130. In response to making the determination, assistance platform 200 is capable of displaying the shortcuts to objects of the determined object type(s) as application-specific assistance as pictured in FIG. 4A. For example, a user of device 100 may choose to share any one or more of the items shown in regions 402, 404, and/or 406 through the social media application executing and displayed on display 130. In response to selecting a URL from region 402, the selected URL, for example, can be opened in the application displayed on display 130 or a UI for sharing the URL can be displayed. In response to selecting a contact, e.g., user B, the contact can be opened in the application displayed on display 130 thereby allowing the user of device 100 to message or otherwise contact user B via the application executing on display 130. In another example, in response to selecting a contact, a new message to the contact can be initiated or started in the application executing on display 130. In response to selecting a photo such as photo 3, the selected photo is opened in the application executing on display 130 (e.g., uploaded or transferred) thereby allowing the user to post the selected photo.

As an illustrative and non-limiting example, in response to the user of device 100 opening an electronic mail or a messaging application so that the application is displayed on display 130, assistance platform 200 is capable of displaying application-specific assistance on display 135 such as shortcuts to one or more other users, e.g., contacts. In response to a selection of a shortcut from the application-specific assistance on display 135, the application executing on display 130 is capable of executing an operation such as initiating a message to the user corresponding to the selected shortcut.

As another illustrative and non-limiting example, in response to the user of device 100 opening a browser application on display 130, assistance platform 200 is capable of displaying application-specific assistance on display 135 such as shortcuts corresponding to previously saved URLs. In response to a selection of a URL from the application-specific assistance on display 135, the browser executing on display 130 is capable of loading the Webpage identified by the URL corresponding to the selected shortcut.

Figure 4B:
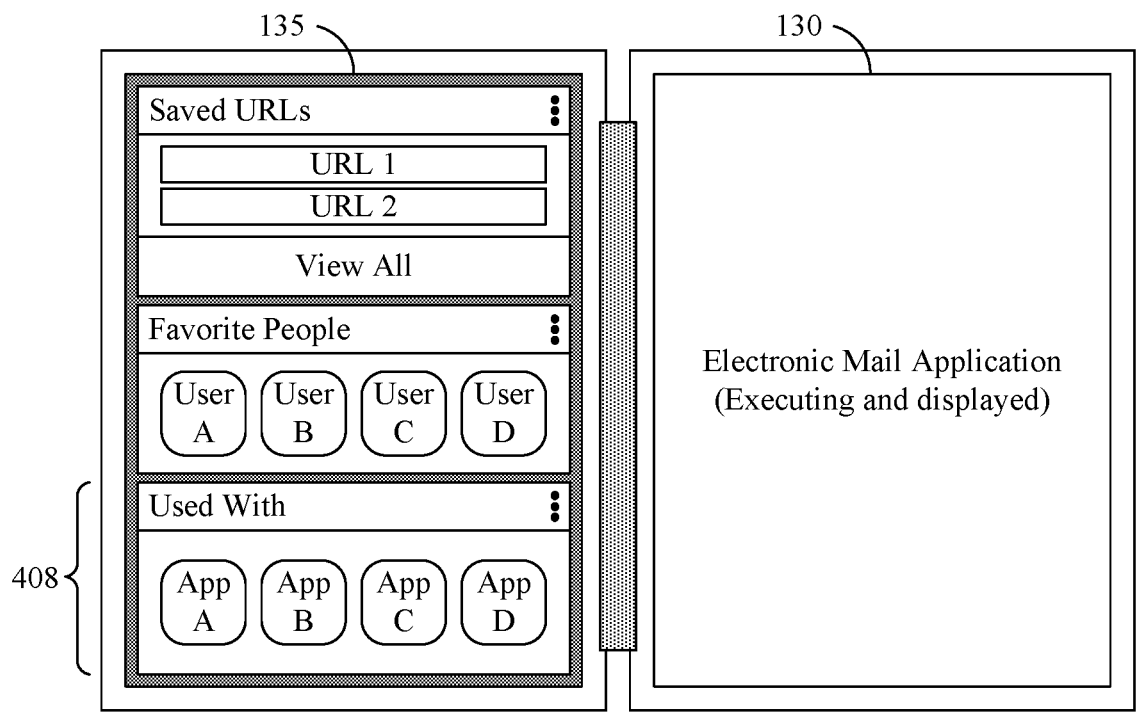

FIG. 4B illustrates another example of providing application-specific assistance. As pictured in FIG. 4B, device 100 is executing an application that is displayed on display 130. In the example of FIG. 4B, the application is an electronic mail application. In one or more embodiments, assistance platform 200 automatically displays application-specific assistance on display 135. For example, in response to the electronic mail (or other application) executing on display 130, device 100 generates and provides application-specific assistance on display 135.

Assistance platform 200 is capable of providing any of the various different types of data described herein as application-specific assistance. Further, assistance platform 200 is capable of determining the particular types of data items and content of such data items to be provided using any of the various discovery mechanisms described. In the example of FIG. 4B, assistance platform 200 provides shortcuts to applications A, B, C, and D in region 408. Assistance platform 200, for example, is capable of determining those applications that are utilized most often while the electronic mail application is executing and displayed on display 130. For example, assistance platform 200 has determined that the user of device 100 uses application A, application B, application C, and application D concurrently with the electronic mail application with at least a minimum frequency based upon historical usage data. Accordingly, assistance platform 200 is capable of displaying the applications as shortcuts that may be selected by the user to execute the application represented by the selected shortcut. In particular embodiments, the application corresponding to the selected shortcut from region 408 is executed and displayed on display 135 so that the application is viewable concurrently with the electronic mail application displayed on display 130.

As an illustrative and non-limiting example, assistance platform 200 is capable of determining that the user often uses a calendar application while using the electronic mail application. Accordingly, assistance platform 200 is capable of displaying a shortcut for executing the calendar application in region 408 or in another region on display 135. The shortcut to the calendar application can be displayed in response to execution and display of the electronic mail application on display 130.

Figure 4C:
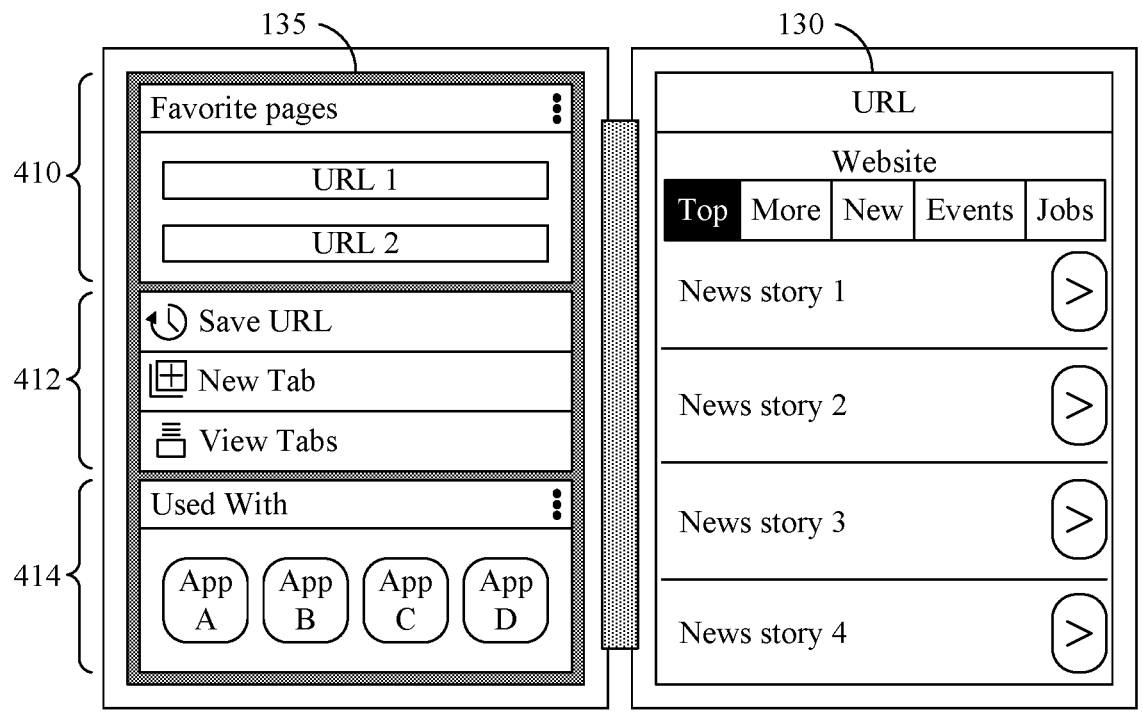

FIG. 4C illustrates another example of providing application-specific assistance. As pictured in FIG. 4C, device 100 is executing an application that is displayed on display 130. In the example of FIG. 4C, the application is a browser displaying a Web page. In one or more embodiments, assistance platform 200 automatically displays application-specific assistance on display 135. For example, in response to the browser executing on display 130, assistance platform 200 generates and provides application-specific assistance on display 135.

In the example of FIG. 4C, the shortcuts displayed in regions 410, 412, and 414 illustrate examples of actions that a user may take in interacting with the browser displayed on display 130. For example, region 410 displays saved shortcuts representing URLs. The URLs may be bookmarks, favorite bookmarks, and/or frequently visited Web pages (e.g., not explicitly saved by the user as a bookmark or favorite). In response to a selection of a shortcut representing a URL, e.g., URL1, the selected URL is provided to the browser and loaded. Region 412 includes shortcuts corresponding to executable operations of the application executing and displayed on display 130. For example, the shortcuts displayed in region 412, when selected, can invoke the executable operations and/or provide a command to the application displayed on display 130 to invoke an executable operation. Examples of the executable operations as pictured in region 412 include, but are not limited to, "Save URL," "New Tab," and "View Tabs." Region 412 illustrates that assistance platform 200 is further capable of displaying executable operations of an application as application-specific assistance. Assistance platform 200 is capable of determining the executable operations via entry points, other inter-application and/or content sharing frameworks, or by the application notifying assistance platform 200 of the particular executable operations and/or commands that are available and may be used for application-specific assistance. Region 414 displays shortcuts to applications that the user often uses concurrently with the browser.

In another illustrative and non-limiting example, in the case where the application executing and displayed on display 130 is an electronic mail application, assistance platform 200 is capable of displaying shortcuts to frequently used contacts as application-specific assistance. As another example, in the case where the application executing and displayed on display 130 is a video streaming application, assistance platform 200 is capable of displaying shortcuts corresponding to suggested videos to view next as application-specific assistance.

Figure 4D:
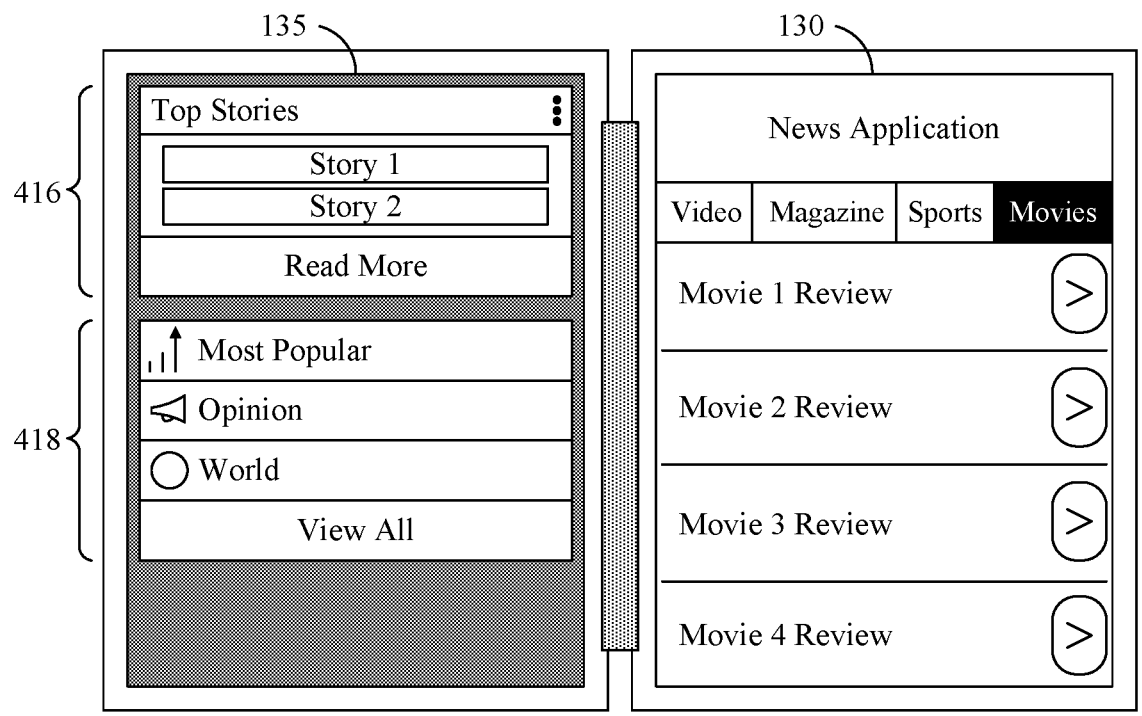

FIG. 4D illustrates another example of providing application-specific assistance. As pictured in FIG. 4D, device 100 is executing an application that is displayed on display 130. In the example of FIG. 4D, the application is a news application. In one or more embodiments, device 100 automatically displays application-specific assistance on display 135. For example, in response to the news application executing on display 130, device 100 generates and provides application-specific assistance on display 135.

In one or more embodiments, assistance platform 200 is capable of generating information highlights as application-specific assistance. In region 416, assistance platform 200 is capable of displaying top stories. The list of top stories, for example, may be obtained directly from the news application. For example, the news application displayed on display 130 may provide or publish a feed specifying top stories that can be presented as a list of shortcuts in region 416 by assistance platform 200.

In another example, assistance platform 200 is capable of obtaining a list of news highlights for the day and providing a shortcut for each such highlight in region 416. In that case, assistance platform 200 is capable of determining additional information from one or more sources other than the application displayed on display 130 based upon the function or identity of the application displayed on display 130.

In region 418, assistance platform 200 is capable of displaying shortcuts to other general categories of news or subject matter. For example, assistance platform 200 is capable of obtaining a list of news categories available in the news application executing and displayed on display 130. Assistance platform 200 is capable of displaying the categories as shortcuts in region 418. In response to a selection of a shortcut from region 418, assistance platform 200 is capable of instructing the news application to display the selected category of news, e.g., most popular, opinion, world, etc.

In another illustrative and non-limiting example, where the application executing and displayed on display 130 is a music or video streaming application, assistance platform 200 is capable of obtaining a list of new content from the music or video streaming application (or service) that can be presented as application specific assistance on display 135.

Figure 5:
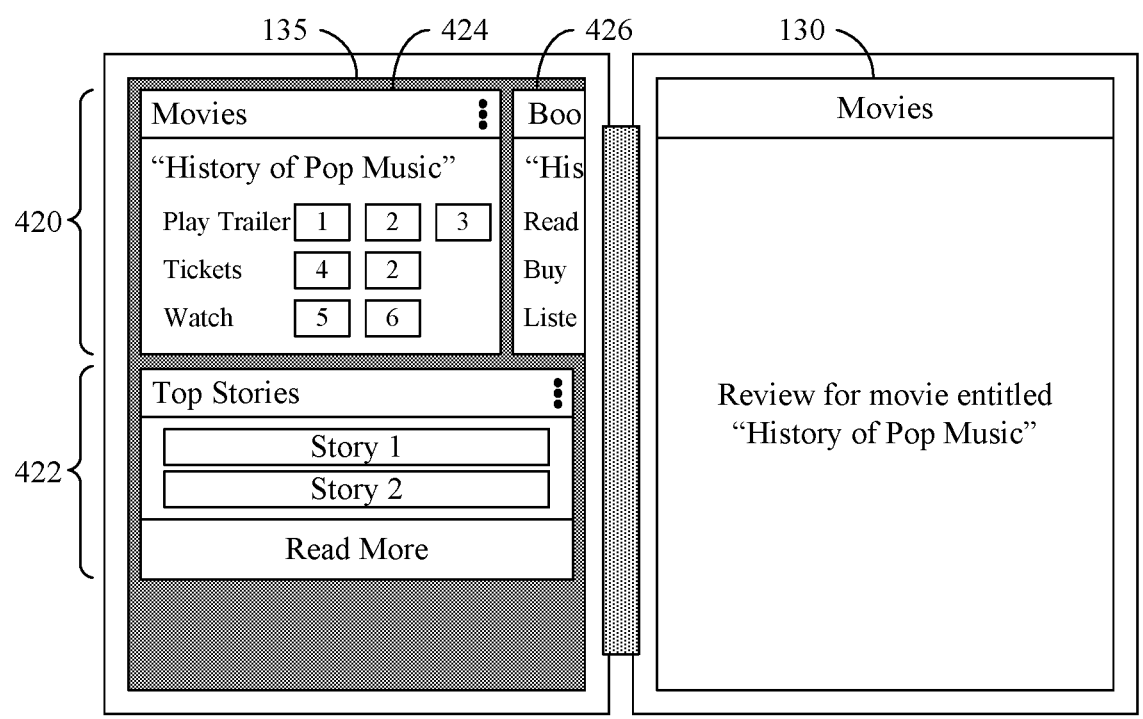
FIG. 5 illustrates an example of application-content-specific assistance.

FIG. 5 illustrates an example of providing application-content-specific assistance. As pictured in FIG. 5, device 100 is executing an application on display 130. In the example of FIG. 5, the application is a news application and the user is viewing content relating to movies. For example, the application may be displaying a review for a movie called "History of Pop Music." In one or more embodiments, device 100 automatically displays application-content-specific assistance on display 135. For example, in response to selecting a particular content item, e.g., an article, within the application executing and displayed on display 130, device 100 generates and provides application-content-specific assistance on display 135.

As discussed, application-content-specific assistance provides additional information about content that is displayed within an executing application that is displayed by device 100. Assistance platform 200 is capable of providing the additional information on display 135 as one or more shortcuts. A shortcut can be selected thereby initiating an action relating to the content displayed on display 130. In one or more embodiments, the action that is initiated through selection of the shortcut is initiated and/or executed by the application that is executing and displayed on display 130. In one or more embodiments, the action that is initiated through selection of the shortcut is initiated and/or executed in a different application than is executing and displayed on display 130.

In the example of FIG. 5, the user of device 100 is reading a movie review for the movie entitled "History of Pop Music" within the news application. Assistance platform 200 is capable of performing semantic analysis on the text of the content (e.g., the movie review) displayed by the application executing and displayed on display 130. Assistance platform 200 is capable of determining the subject matter of the content which is, in this case, the movie entitled "History of Pop Music." In the example shown, assistance platform 200 has identified the movie "History of Pop Music" from the content and is providing shortcuts for executable operations relating to the movie "History of Pop Music" in window 424 of region 420 on display 135 as application-content-specific assistance. More particularly, assistance platform 200 is capable of providing shortcuts for playing a trailer of "History of Pop Music," purchasing tickets for "History of Pop Music," and for watching "History of Pop Music."

In cases where the action may be performed via more than one other source or application, a shortcut for more than one source, application, and/or provider can be provided. For example, assistance platform 200 provides shortcuts 1, 2, and 3 as different sources from which the trailer for the movie "History of Pop Music" can be watched. Assistance platform 200 is capable of providing shortcuts 4 and 2 as different sources from which tickets for the movie "History of Pop Music" can be purchased (where source 2, for example, provides both viewing of the trailer and purchase of tickets). Assistance platform 200 is capable of providing shortcuts 5 and 6 as different sources from which the user is able to watch the movie "History of Pop Music." For example, shortcuts 5 and 6 may correspond to two different streaming services.

In the example of FIG. 5, assistance platform 200 also has generated a window 426 corresponding to a book also entitled "History of Pop Music." Window 426 is partially displayed. In window 426, assistance platform 200 is capable of providing similar shortcuts for reading, buying, and/or listening to the book entitled "History of Pop Music." A user may access window 424 and/or 426 by swiping left or right in region 420.

In one or more embodiments, assistance platform 200 is also capable of providing additional information about the movie and/or book entitled "History of Pop Music." Examples of such additional information can include, but are not limited to, release date, plot synopsis, user ratings, and review summaries. In particular embodiments, assistance platform 200 is capable of receiving a user input requesting that a shortcut or content be saved for later action. For example, a user is capable of selecting a control (not shown) that causes assistance platform 200 to save the current content, e.g., data or an object specifying a type as "movie" and having a title of "History of Pop Music." It should be appreciated that assistance platform 200 is capable of storing additional information relating to the movie such as release data, user ratings, etc. for later recall and/or action upon request of the user.

Figure 6A:
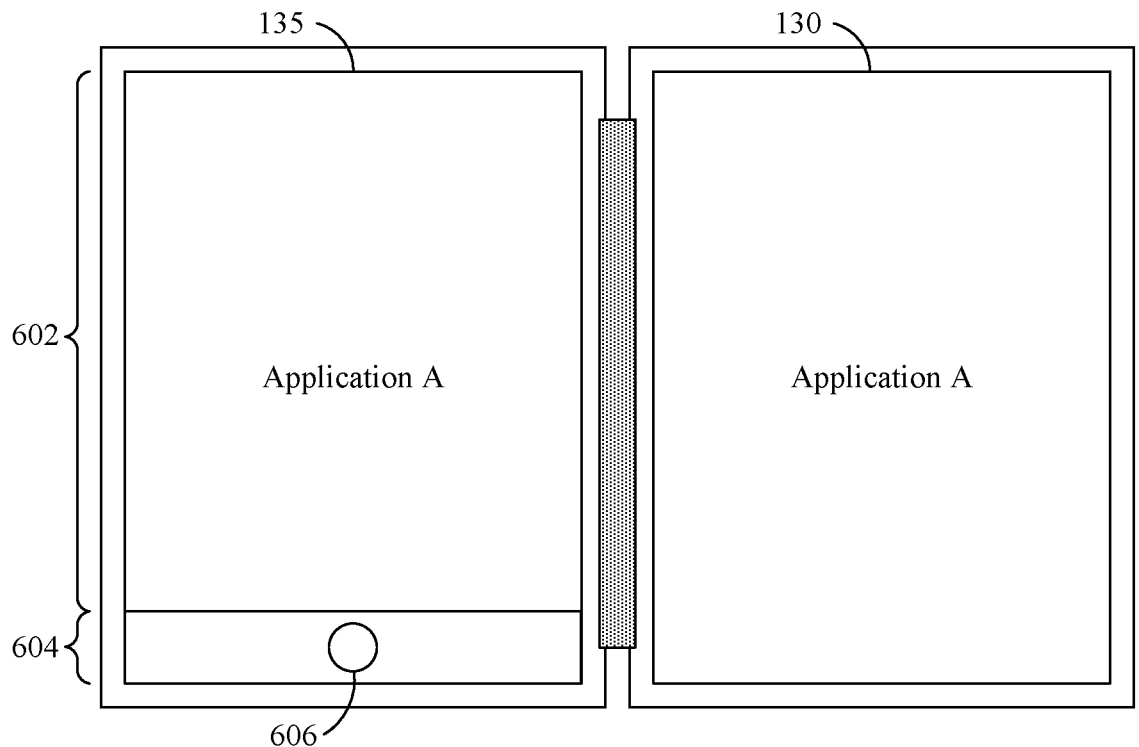
FIGS. 6A-6B illustrate an example of navigating between an application and different types of assistance.
Figure 6B:
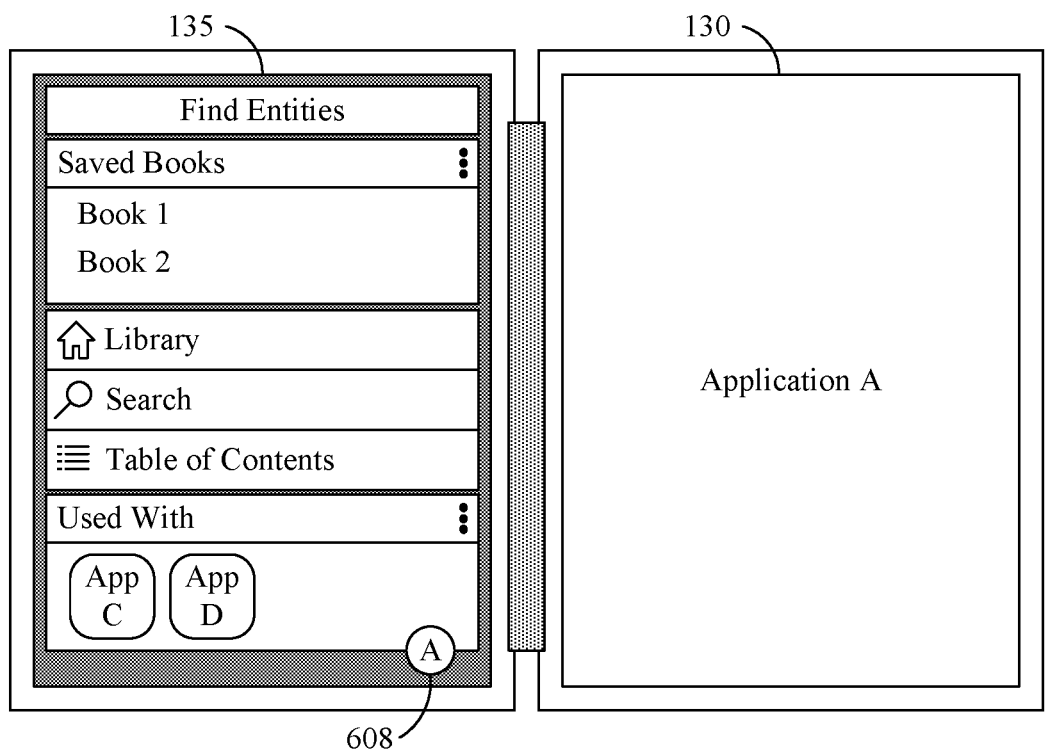

FIGS. 6A-6B illustrate an example of navigating between an application and different types of assistance. In the example of FIG. 6, an application referred to as "Application A" is executing and is configured to display on both of displays 130 and 135. As an illustrative and non-limiting example, "Application A" is an electronic reading application. Other examples of "Application A," however, can include, but are not limited to, an electronic mail application, a word processing application, and a calendar application.

In the example of FIG. 6A, "Application A" is displayed on the entirety of display 130 and in region 602 of display 135. In one or more embodiments, region 604 of display 135 is reserved for displaying one or more controls such as control 606. Control 606 is capable of causing "Application A" to be toggle from being displayed using both of displays 130 and 135 to being displayed by only one display, or at least fewer displays in the case where device 100 includes more than two displays. For example, in response to activation of control 606, assistance platform 200 displays "Application A" only on display 130 as illustrated in FIG. 6B. In one or more embodiments, assistance platform 200 is capable of displaying "Application A" using the entirety of display 135 and control 606 can be floated or superimposed atop of the displayed application.

In particular embodiments, also in response to selection of control 606, assistance platform 200 is capable of providing application-specific content or application-content-specific content on display 135. For example, in response to selection of control 606, assistance platform 200 changes the mode of display for "Application A" from being displayed on both of displays 130 and 135 to only being displayed on display 130. In addition, in response to selection of control 606 and/or in response to detecting that "Application A" is displayed on display 130 and no longer displayed on both displays 130 and 135, assistance platform 200 is capable of determining and displaying application-specific assistance and/or application-content-specific assistance on display 135.

In the example of FIG. 6B, a control 608 is provided. Control 608 causes assistance platform 200 to display "Application A" on both of displays 130 and 135. For example, in response to activation of control 608, assistance platform 200 is capable of changing the mode of display for "Application A" from being displayed only on display 130 to being displayed across both of displays 130 and 135. Thus, in response to a selection of control 608, device 100 is capable of reverting to the state illustrated in FIG. 6A. In this manner, a user is capable of switching between using multiple displays to interact with an application and using at least one display for obtaining some type of assistance.

In one or more embodiments, referring to FIG. 6, whether assistance platform 200 provides application-specific assistance or application-content-specific assistance can be a preference setting that can be set by the user. In particular embodiments, assistance platform 200 is capable of providing both application-specific assistance and application-content-specific assistance in a same display, e.g., on display 135. The content provided may be provided in a scrollable view in the event that more assistance is available that can be displayed on display 135.

Figure 7A:
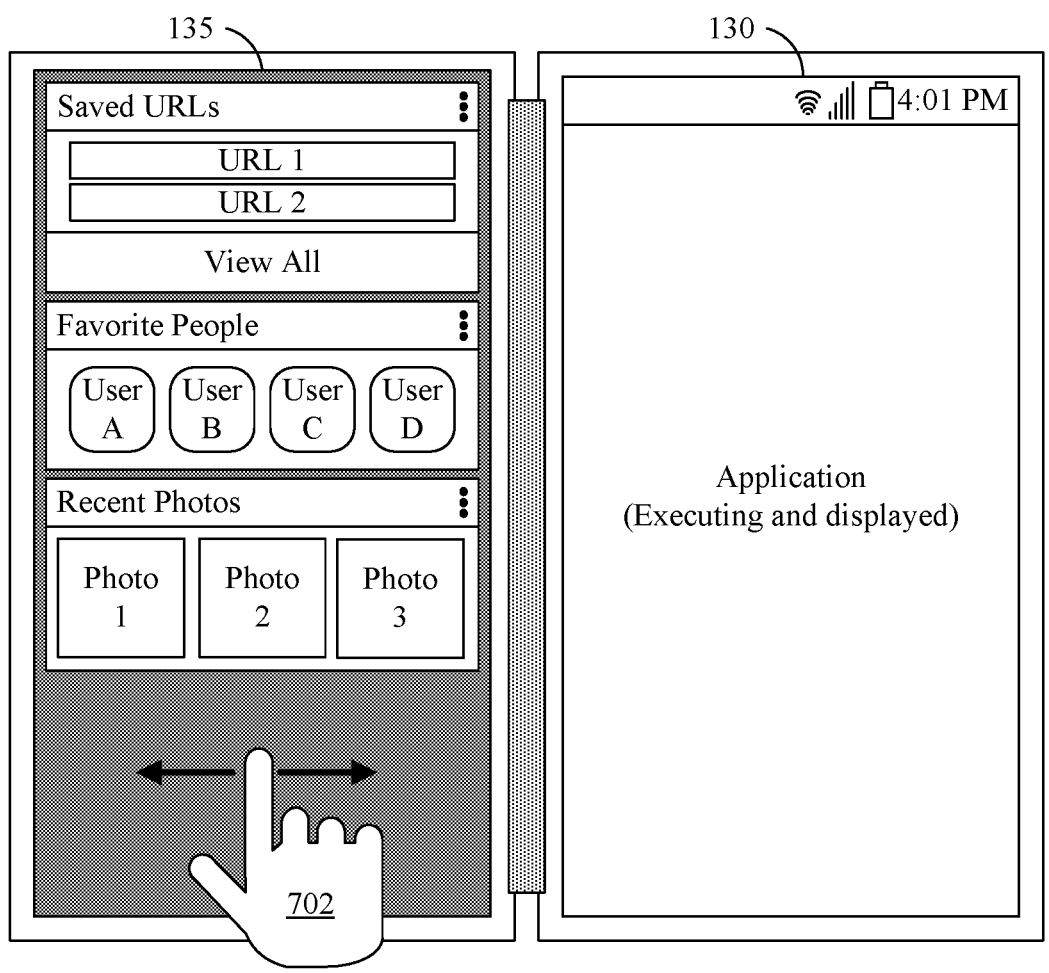
FIGS. 7A-7B illustrate an example of navigating between different types of assistance.
Figure 7B:
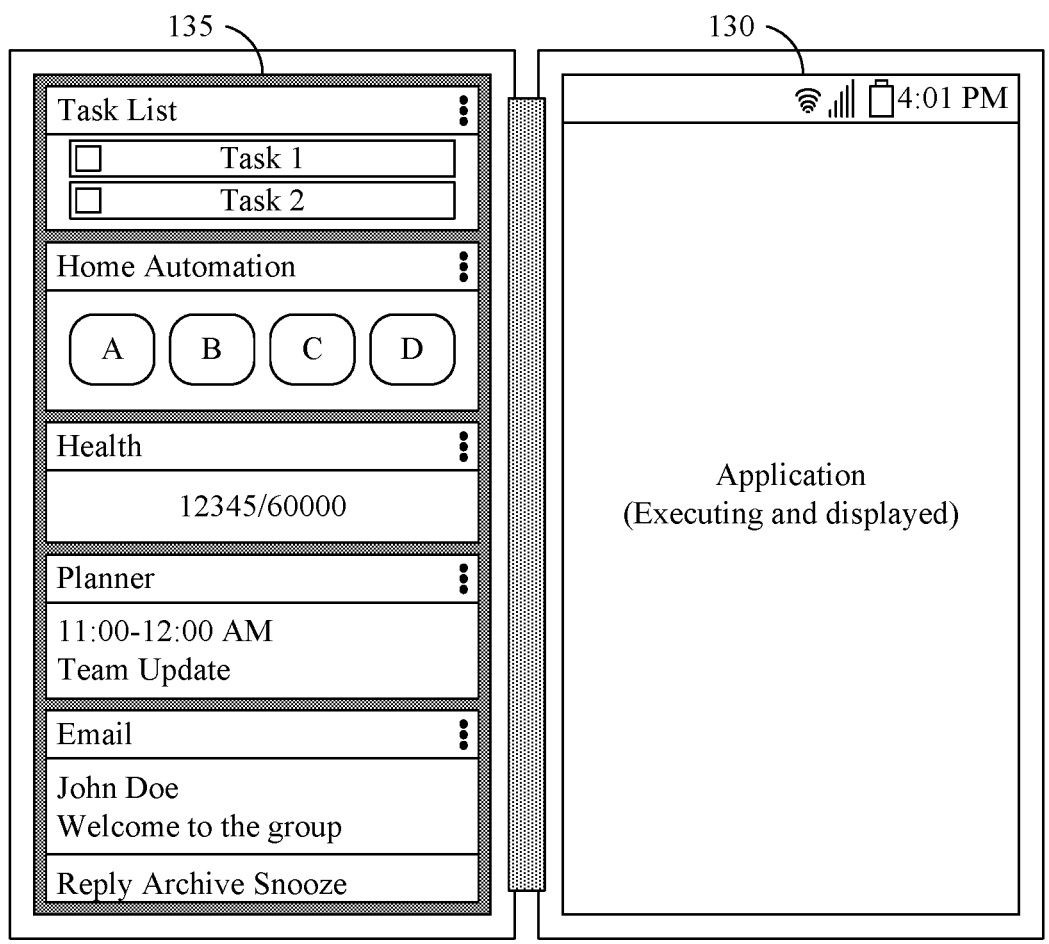

FIGS. 7A-7B illustrate an example of navigating between different types of assistance. In one or more embodiments, each different type of assistance, e.g., general assistance, application-specific assistance, and application-content-specific assistance, can be provided in a different overlay. In the example of FIG. 7A, an application is executing and displayed on display 130, while application-specific content is displayed on display 135. In response to a user input 702 such as a swipe left or a swipe right, the overlay shown in FIG. 7A for application-specific assistance is no longer displayed thereby revealing an overlay for general assistance as pictured in FIG. 7B. Thus, the user is capable of navigating from one type of assistance to another manually as may be desired. With the overlay for general assistance displayed as illustrated in FIG. 7B, the application-specific overlay may be brought back and displayed in response to another user input. For example, a swipe in the opposite direction of user input 702 can cause the application-specific overlay to once again be displayed.

In one or more embodiments, different overlays can be stacked so that the user is capable of moving through and viewing the different types of assistance and navigating from one to another and/or back again. In another example, the user can swipe to cycle through the available overlays. As an illustrative and non-limiting example, a user may be interacting with an application that is executing and displayed on display 130. Assistance platform 200 is capable of displaying an application-content-specific assistance overlay on display 135. Beneath the application-content-specific assistance overlay can be the application-specific overlay. Beneath the application-specific overlay can be the general assistance overlay. The user can navigate between the different overlays by providing user inputs, e.g., gestures or swipes, to move through the stack forward and/or backward. In particular embodiments, anytime that a more specific form of assistance is presented as an overlay, the more generalized types of assistance can be accessed in this manner.

In another illustrative and non-limiting example, assistance platform 200 is capable of providing general assistance on a secondary display when the user accesses a home screen of the device on the primary display. When the user opens an application on the primary display, assistance platform 200 is capable of displaying an application-specific assistance overlay atop the general assistance overlay. This functionality in the assistance UI allows users to directly access the application-specific assistance and further slide the overlay out of the way to quickly access the general assistance overlay.

In one or more embodiments, different types of assistance can be provided in different tabs. By providing a tabbed interface on display 135, a user is capable of accessing any one of the different types of assistance. Further, by virtue of the tabs being displayed, the user is made aware of the particular types of assistance that are available at any given time. In particular embodiments, one or more or all of the different types of assistance can be provided in a single, unified window that may be scrollable. Such a window, for example, can be displayed on display 135. Within the scrollable window, different types of data for the different types of assistance can be interleaved or segregated according to assistance type.

Figure 8:
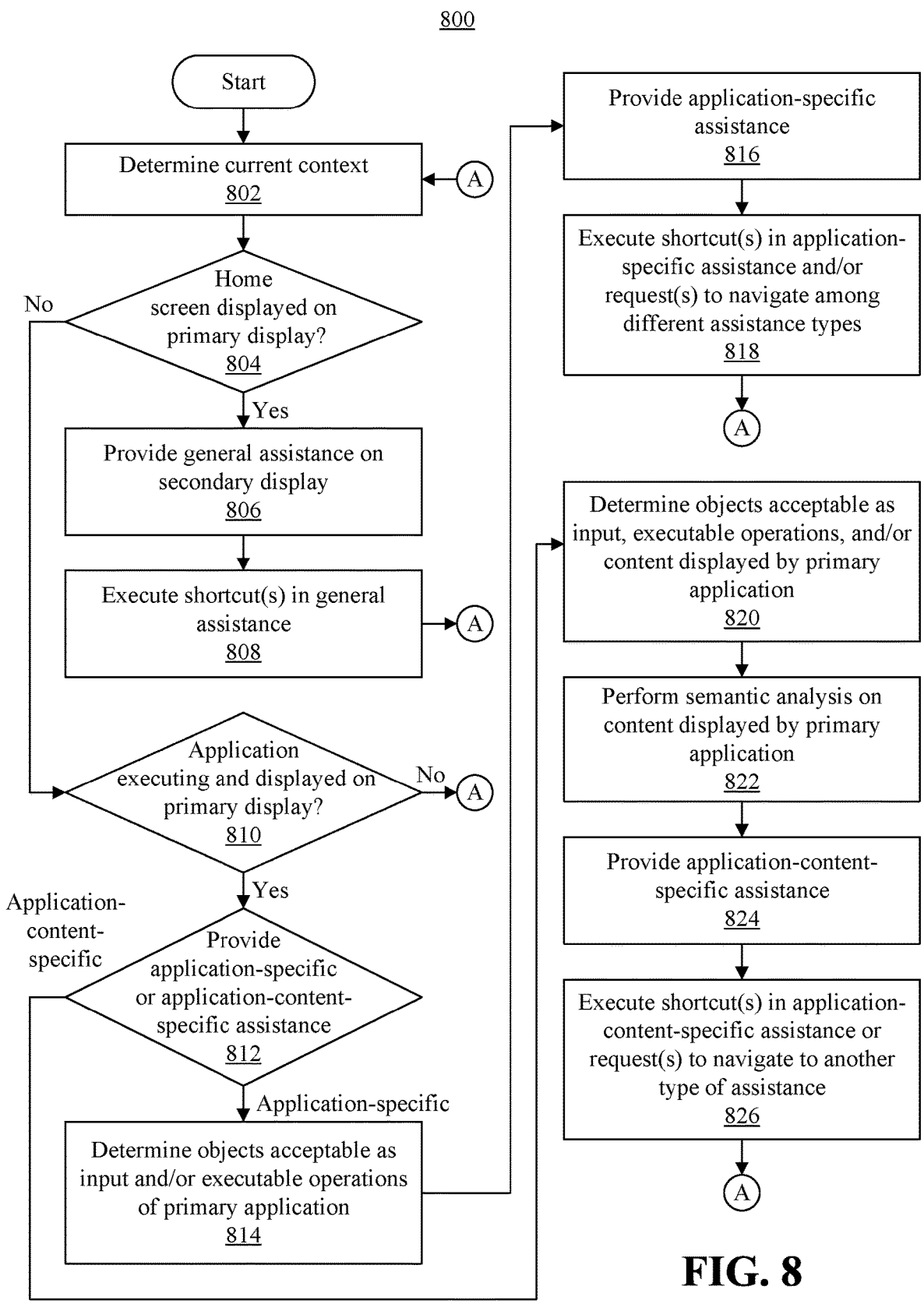
FIG. 8 illustrates an example method of providing assistance.

FIG. 8 illustrates an example method 800 of providing assistance. A device as described herein with reference to FIGS. 1-7 is capable of performing the operations described in method 800. FIG. 8 illustrates an illustrative and non-limiting example of the operation of a device as described to provide various types of assistance to a user. FIG. 8 further illustrates different conditions under which such assistance may be provided.

In block 802, the device is capable of determining a current context. The current context can include any of a variety of different types of information. Examples of different types of information that can be stored in memory as a current context can include, but are not limited to, current, previous, and/or estimated future location (e.g., based upon historical movement patterns) of the user and/or the device; the current time of day; the user's usage patterns of the device relating to applications, shortcuts, and other information (e.g., content) access; the user's calendar; the current and/or future weather; current and/or historical traffic patterns; orientation of the device; and the position or angle of one display of the device relative to one or more other displays of the device.

In one or more embodiments, the current context includes or specifies whether an application is executing and is displayed on the primary display and, if so, the particular application that is displayed. In particular embodiments, in the case where an application (referred to herein as the "primary application") is executing and displayed on the primary display, the current context specifies the name or identity of the primary application. In particular embodiments, the current context specifies object types that the primary application is capable of receiving as input and, as such, upon which the primary application is capable of operating. In particular embodiments, the current context specifies executable operations available from the primary application that may be invoked by the assistance platform. In particular embodiments, the current context specifies whether content is loaded and/or displayed by the application.

The current context may be determined or provided from the primary application, from the operating system of the device, or determined (e.g., generated) by the assistance platform. In one or more embodiments, one or more items of the current context are determined by different sources. For example, one or more items of the current context are determined from the primary application, one or more items of the current context are provided by the operating system, and/or one or more items of the current context are determined directly by the assistance platform.

For purposes of illustration, the determination of the current context by the device is illustrated as being performed in a particular block of method 800. In one or more embodiments, the current context can be determined by the device at various times and/or in response to different conditions. For example, the device is capable of determining and/or updating the current context of the device on an ongoing basis, e.g., continually or periodically. The device is capable of updating the current context in response to detecting particular conditions and/or events. For example, the device is capable of updating the current context in response to a user input. Examples of the user input include activating the device, executing an application or executing a different application as the primary application, placing the device in a predetermined orientation and/or position (e.g., angle as described above), or a request for a particular type of assistance. The assistance platform is capable of providing updated or changed assistance (e.g., general assistance, application-specific assistance, and/or application-content-specific assistance) in response to any change in the current context. In one or more embodiments, a change in current context includes a change in the content displayed by the primary application.

In block 804, the device is capable of determining whether the home screen is displayed on the primary display. For example, the assistance platform is capable of detecting that the device is active and the displays, or at least the primary display is, turned on. In that case, the assistance platform is capable of determining whether the primary display is displaying a home screen for the device, e.g., from the current context. If the home screen is displayed on the primary display, method 800 continues to block 806. If not, method 800 proceeds to block 810.

In block 806, the device provides general assistance on the secondary display. In one or more embodiments, the general assistance is provided within an overlay that is displayed on the secondary display. An overlay can be implemented as a window interface element that is displayed to provide information and/or shortcuts for providing assistance to a user of the device. In one or more embodiments, the device is capable of providing general assistance in response to detecting that the home screen is displayed on the primary display.

In block 808, the device optionally executes one or more shortcuts provided as part of the general assistance on the secondary display. In response to a user selection of a shortcut, for example, the assistance platform is capable of executing the shortcut. After block 808, method 800 can loop back to block 808 to continue processing.

Continuing with block 810, the device is capable of determining whether an application is executing and displayed on the primary display. In response to determining that an application is executing and displayed on the primary display, method 800 continues to block 812. In response to determining that an application is not executing and displayed on the primary display, method 800 loops back to block 802 to continue processing.

In block 812, the device determines whether to provide application-specific assistance or application-content-specific assistance. In one or more embodiments, the assistance platform is capable of determining which type of assistance to provide based upon stored preferences. The preferences stored in memory are capable of defining the conditions and/or circumstances when application-specific assistance is provided and when application-content-specific assistance is provided. In particular embodiments, the preferences are user adjustable.

In one or more embodiments, the preferences are specified on a per-application basis. For example, in response to determining that an application is displayed on the primary display, the assistance platform is capable of looking up the application in the preferences and implementing either application-specific assistance or application-content-specific assistance based upon the entry for the application. Each application may be listed in the preferences individually with a preference for the type of assistance provided that is independent of the other applications listed. Thus, in particular embodiments, the type of assistance provided by the assistance platform is specific to, or customized to, the primary application at any given time.

As an illustrative and non-limiting example, the preferences may indicate that if Application A is the primary application, the assistance platform provides application-specific assistance. The preferences may indicate that if Application B is the primary application, the assistance platform provides application-content-specific assistance. It should be appreciated that as different applications become the primary application over time, the application-specific assistance or application-content-specific assistance that is displayed on the secondary display (or the display other than the display currently displaying the application) can be automatically updated to conform with the particular application that is the primary application. For example, if Application A is the primary application and then application B becomes the primary application replacing Application A, the assistance platform displays application-specific assistance (or application-content-specific assistance) for Application A while application A is the primary application and automatically displays application-specific assistance (or application content-specific assistance) for application B while application B is the primary application.

In particular embodiments, the preferences further are capable of specifying additional conditions such whether the assistance platform should provide application-content-specific assistance when the primary application has content loaded therein. This preference can be specified on a per-application basis. As an illustrative and non-limiting example, the preferences may indicate that if Application A is the primary application and does not have content such as a file loaded therein as input (e.g., is not displaying content), the assistance platform provides application-specific assistance. The preferences are capable of specifying that if Application A is the primary application and has content loaded therein and/or is displaying content (e.g., a file is loaded in Application A), the assistance platform provides application-content-specific assistance.

In one or more embodiments, though not illustrated in FIG. 8, the preferences further are capable of specifying that the assistance platform provides both application-content-specific assistance and application-specific assistance concurrently in a same view or overlay. In particular embodiments, the data and/or shortcuts are grouped, e.g., segregated, within the overlay based upon whether the data items and/or shortcuts are considered application-specific assistance or application-content-specific assistance. In particular embodiments, the data items and/or shortcuts of different types of assistance are intermingled within the overlay or view displayed.

For purposes of illustration and not limitation, further example rules for determining whether to provide application-specific assistance or application-content-specific assistance are described. In an example, the device is capable of determining whether named entities can be found within displayed content. If so, the device is capable of providing application-content-specific assistance. For example, if the device determines that one or more named entities are the topic of the content displayed (e.g., the named entity or entities are mentioned in multiple topics and a topic extraction technique suggests the topics), the device provides application-content-specific assistance. In another example, the device is capable of detecting named entities such as movies or books in which the user has previously expressed interest either explicitly or through previous behavior and/or interactions. In such cases, the device is capable of providing application-content-specific assistance.

In another example, the device is capable of providing application-content-specific assistance only for specific user-designated applications based upon a user preference or as determined from the device through inference based upon user behavior. In another example, the device is capable of providing application-content-specific assistance in response to a user request for such assistance. The device is capable of providing application-content-specific assistance whether for all displayed content or for a subset of displayed content.

In one or more embodiments, the device is capable of providing application-specific assistance in response to determining information that accelerates user interaction with the application. As noted, examples of information that accelerates user interaction with an application can include, but are not limited to, executable operations of the application and object types that can be received by the application as input(s). For example, in response to detecting one or more registered operations for the application and/or one or more registered object types that can be received as input for the application, the device is capable of providing such information as application-specific assistance.

Continuing in the case where the device provides application-specific assistance, in block 814, the device is capable of determining the object types that are acceptable (e.g., can be received) as input by the primary application. For example, the assistance platform is capable of determining the types of data, e.g., file types, upon which the application that is executing and displayed on the primary display is capable of operating and/or accepting as input. The device is further capable of determining executable operations of the application that is executed and displayed on the primary display. For example, the device is capable of determining the executable operations of the application that is currently executing and displayed on the primary display that can be made available as shortcuts within the application-specific assistance.

In block 816, the device provides application-specific assistance. In one or more embodiments, the application-specific assistance is provided on the secondary display and is shown concurrently with the application executing and being displayed on the primary display. The application-specific assistance can include information and/or shortcuts to executable operations and/or objects. In particular embodiments, the application-specific assistance can be provided on an overlay. The application-specific assistance overlay, for example, may be displayed or superimposed over an overlay that provides general assistance on the secondary display and/or an overly that provides application-content-specific assistance. The application-specific assistance overlay can include one or more items of information and/or shortcuts as described herein in connection with FIG. 4.

In block 818, the device optionally executes one or more shortcuts provided or displayed as application-specific assistance and/or executes one or more requests to navigate among different assistance types. For example, in response to a user selection of a shortcut, the assistance platform is capable of executing the shortcut and/or providing the application any data and/or instructions necessary for initiating execution of the particular operation associated with the selected shortcut. In another example, in response to a user selection of a shortcut, the assistance platform is capable of executing the shortcut and/or providing another application (e.g., an application other than the primary application) any data and/or instructions necessary for initiating execution of the particular operation associated with the selected shortcut. In the latter case, the assistance system is capable of first executing the other application. In another example, in response to a user request, e.g., a user input, to navigate to a different type of assistance, the assistance platform is capable of displaying another, different assistance overlay over the currently displayed overlay and/or removing the currently displayed overlay to reveal another different assistance overlay.

As an illustrative and non-limiting example, if the application-specific assistance overlay is displayed, the assistance platform is capable of displaying the general assistance overlay over the application-specific assistance overlay (or removing the application-specific assistance overlay to reveal the general assistance overlay) on the secondary display in response to a user request to navigate among the different types of available assistance. In another illustrative and non-limiting example, the assistance platform is capable of displaying the application-content-specific assistance overlay over the application-specific assistance overlay on the secondary display (or removing the application-specific assistance overlay to reveal the application-content-specific assistance overlay) in response to a received user input requesting navigation among the different types of available assistance.

For example, the device is capable of determining the application executing and displayed on the secondary screen, determining the objects upon which such application is capable of operating and/or capable of receiving as input, and determining the executable operations of the application on an ongoing basis, e.g., continually or periodically and automatically, and/or in response to particular conditions and/or events. For example, the device is capable of determining such information in response to a user input. Examples of the user input may include activating the device, executing an application or executing a different application than previously executed and displayed on the primary display, placing the device in a predetermined orientation and/or position (e.g., angle as described above), or in response to a request for a particular type of assistance.

The assistance platform is capable of automatically updating the application-specific assistance that is provided in response to detecting any changes in the application that is executing and displayed on the primary display, detecting any changes in the type of objects upon which such application is capable of operating and/or receiving as input, and/or detecting any changes in the executable operations provided or available from the application. For example, the assistance platform is capable of changing the information and/or operations available as shortcuts in the application-specific assistance based upon the application that is executing, the types of objects that can be accepted as input, and/or the particular operating state of the application.

After block 818, method 800 can loop back to block 802 and continue processing.

Continuing with block 820, in the case where the assistance platform provides application-content-specific assistance, the device determines the objects types that are acceptable (e.g., can be received) as input by the application executing and displayed on the primary display. For example, the assistance platform is capable of determining the types of data, e.g., files types, upon which the primary application is capable of operating and/or accepting as input. The device is further capable of determining executable operations of the primary application. For example, the device is capable of determining the executable operations of the primary application that can be made available as shortcuts within the application-specific assistance. The device is further capable of determining content that is displayed and/or provided by the primary application that is executing and displayed in the primary display. For example, the device is capable of determining portions of a file that are loaded and displayed on the primary display by the primary application.

In block 822, the assistance platform is capable of performing semantic analysis of content displayed by the primary application. In one or more embodiments, the assistance platform is capable of interacting with the primary application to identify content of interest. For example, the assistance platform is capable of identifying that content displayed by primary application describes or relates to a movie. As discussed, the semantic analysis can be performed on text and/or on images currently visible in the application. In particular embodiments, the assistance platform is capable of recognizing content by using a named entity database to identify candidate content from displayed text while using object recognition to identify candidate content in images.

In another illustrative and non-limiting example, the assistance platform is capable of using the identity of the application itself to filter the type of content that is displayed. The assistance platform can the type, function, or category of the primary application. For example, the assistance platform is capable of recognizing the primary application as an application for reviewing local businesses. As such, the assistance platform is capable of determining that the application is unlikely to relate to books and refrain from providing application-content-specific assistance relating to books despite determining that one or more book titles are related to content displayed by the primary application.

In block 824, the device provides application-content-specific assistance. In one or more embodiments, the application-content-specific assistance is provided on the secondary display and is shown concurrently with the primary application on the primary display. In particular embodiments, the application-content-specific assistance can be provided as an overlay. The application-specific assistance overlay, for example, may be displayed or superimposed over an overlay that provides general assistance on the secondary display. The application-content-specific assistance overlay can include one or more items of information and/or shortcuts as described herein in connection with FIG. 5.

In block 826, the device optionally executes one or more shortcuts provided or displayed as application-content-specific assistance and/or executes one or more requests to navigate among different assistance types. For example, in response to a user selection of a shortcut, the assistance platform is capable of executing the shortcut. The assistance platform is capable of providing the application with any data and/or instructions necessary for initiating execution of the particular operation associated with the selected shortcut. In another example, in response to a user selection of a shortcut, the assistance platform is capable of executing the shortcut and/or providing another application (e.g., an application other than the primary application) any data and/or instructions necessary for initiating execution of the particular operation associated with the selected shortcut. In the latter case, the assistance system is capable of first executing the other application. In another example, in response to a user request, e.g., a user input, to navigate to a different type of assistance, the assistance platform is capable of displaying another, different assistance overlay over the currently displayed overlay.

As an illustrative and non-limiting example, if the application-content-specific assistance overlay is displayed, the assistance platform is capable of displaying the general assistance overlay over the application-content-specific assistance overlay on the secondary display (or removing the application-content-specific assistance overlay to reveal the general assistance overlay) in response to a user request to navigate among the different types of available assistance. In another illustrative and non-limiting example, the assistance platform is capable of displaying the application-specific assistance overlay over the application-content-specific assistance overlay on the secondary display (or removing the application-content-specific assistance overlay to reveal the application-specific assistance overlay) in response to a received user input requesting navigation among the different types of available assistance.

For purposes of illustration, the semantic analysis of content displayed by the application is illustrated as being performed in a particular block of method 800. In one or more embodiments, the semantic analysis and/or image processing of content displayed by the primary application can be performed at various times and/or in response to different conditions as generally described herein. For example, the device is capable of determining such information on an ongoing basis automatically (e.g., continually or periodically), and/or in response to particular conditions and/or events including user inputs. Examples of events can include the primary application displaying different content than previously displayed (whether loading entirely new content or scrolling through content to display different portions of the same content or file). The assistance platform is capable of automatically updating the application-content-specific assistance that is provided in response to detecting any changes in the information described. For example, the assistance platform is capable of changing the information and/or operations available as shortcuts in the application-content-specific assistance based upon detecting a change or modification to the content displayed by the primary application.

FIG. 8 is provided for purposes of illustration only. As such, the examples described in connection with FIG. 8 should not be construed as limitations. In one or more embodiments, for example, the assistance platform is capable of providing assistance in response to a user request for assistance. Further, the assistance platform is capable of providing a particular type of assistance if specifically requested by way of a received user input. In particular embodiments, the assistance platform is capable of providing assistance for content displayed anywhere on a display, content explicitly selected by the user, or content in a region of a display selected by the user.

In particular embodiments, the assistance platform is capable of refining the assistance provided to users based upon feedback received from the user via the device. In one or more embodiments, the feedback is implicit. For example, the assistance platform is capable of determining how frequently the user views or interacts with assistive content (or with applications that offer assistive content). The assistance platform is capable of providing or showing assistive content with which the user interacts more frequently. The assistance platform is capable of reducing the frequency with which items of assistive content are provided in response to determining that the user interacts with such items of assistive content less frequently.

In one or more embodiments, the feedback is explicit. For example, the assistance platform can receive data specified by one or more user inputs that indicates the particular assistive content the user wants to see and the conditions under which the assistive content should be provided, e.g., the conditions that may be automatically detected by the assistance platform to provide the assistive content. The assistance platform is also capable of receiving data from user inputs indicating particular assistive content the user does not wish to see or would like to see less often. The data may also specify particular conditions in which particular assistive content should not be provided by the assistance platform.

Within this disclosure, embodiments are described where a device has multiple displays. In the examples described, the device is a dual-display device. In one or more embodiments, the device has more than two displays. In particular embodiments, the device has three displays. In that case, one display is capable of supporting primary interaction with an application (e.g., displaying an executing application), while the second display is capable of providing application-specific and/or application-content-specific assistance, while the third display is capable of providing general assistance.

In one or more embodiments, the device has four displays. In that case, the assistance platform is capable of allocating each different type of assistance to a different display, e.g., to the second, third, and fourth displays. The first display can be allocated to providing a home screen and/or displaying an application that is executing. In still another embodiment, the device may include or use one or more additional displays to show additional content for a specific assistance type and provide an interaction method to switch between assistance types.

In particular embodiments, the techniques described herein can be applied to a device having a single display. For example, access to assistance and the different types of assistance can be provided through a hardware control (e.g., a hardware button) and/or a software control such as by providing a predetermined gesture such as swiping to a particular region of the display or by providing another user input. As an illustrative and non-limiting example, a user can switch between the current application displayed on the display or the home screen and one or more types of assistance via the hardware control, the software control, and/or by performing the gesture in a particular region of the display.

In particular embodiments, when the device is implemented as a single screen device having a larger display, e.g., a tablet computer, a laptop computer, or a television, one or more assistance interfaces can be positioned and displayed about the display. In an example, the assistance platform is capable of generating the assistance UI as one or more sidebars or overlays positioned on an edge or on edges of the display. The sidebars can have a fixed size, be extensible, and/or be collapsible. In another example, a particular sidebar (e.g., one sidebar) can include one or more different types of assistance. Further, multiple sidebars can be provided concurrently. In another example, the assistance UI can be implemented as a resizable and/or movable window that the user can move around the display. The window can include one or more different types of assistance. Further, multiple windows can be made available concurrently.

In one or more embodiments, the device includes a single screen and is communicatively linked to another device through which assistance can be provided. The assistance platform is capable of displaying a home screen and/or an application that is executing on a primary display within a first device while assistance is displayed on a secondary display located in a second and separate device that is communicatively linked to the first device. For example, the second device may include client software capable of interacting with the assistance platform to receive assistance information and/or instructions for displaying or providing the assistance information.

In an example, the first device including the primary display is a laptop or other computer system while the secondary display is implemented within a smart phone, a tablet computer, or a smart watch that is communicatively linked to the first device with the primary display. The second device including the secondary display is capable of providing general assistance, application-specific assistance, and/or application-content-specific assistance. In another example, the first device including the primary display, e.g., a laptop or other computer, is capable of displaying one or more applications while a secondary display in a second device (e.g., a smart phone) is capable of displaying application-specific assistance and a further secondary display in a third device (e.g., a tablet computer) is capable of displaying application-content-specific assistance.

In another example, the first device including the primary display is a smart phone while the secondary display is included in a smart watch communicatively linked to the smart phone. The smart watch is capable of displaying general assistance, application-specific assistance, and/or application-content-specific assistance.

In another example, the first device is a television capable of executing and/or displaying one or more applications. The television is also capable of executing the assistance platform. A user is able to interact with the one or more applications on the television. The second device including a secondary display may be a laptop computer, a tablet computer, a smart phone, or a smart watch communicatively linked to the television. The secondary display of the second device is capable of providing general assistance, application-specific assistance, and/or application-content-specific assistance concurrently with the television displaying the one or more applications.

In another example, the first device is a smart phone capable of executing and displaying one or more applications on a primary display included therein. A user is capable of interacting with the one or more applications. The second device, which is communicatively linked with the first device, may be a computing system within an automobile having an integrated display capable of operating as the secondary display. Under control of the assistance platform within the first device, the secondary display of the computing system within the automobile is capable of displaying assistance, application-specific assistance, and/or application-content-specific assistance concurrently with the one or more applications displayed on the primary display of the smart phone.

In another example, the first device is a computing system within an automobile having an integrated display operating as a primary display that is capable of displaying one or more applications. A user is capable of interacting with the one or more applications on the display of the computing system within the automobile. The second device communicatively linked with the first device may be a smart phone. The smart phone is capable of displaying general assistance, application-specific assistance, and/or application-content-specific assistance concurrently with the primary display displaying the one or more applications.

In one or more embodiments, the assistance platform is capable of providing assistance content on one or more real (e.g., physical) displays and through one or more virtual devices. Within a virtual reality system such as a cave automatic virtual environment (CAVE), for example, the system is capable of providing general assistance, application-specific assistance, and application-content-specific assistance to a user through one or more virtual devices. The assistance platform is capable of projecting content onto screens around the user. As an illustrative and non-limiting example, a virtual device manager (e.g., executing software) can be included that is capable of supplementing an existing single display or multi-display device with one or more additional virtual devices that can subdivide existing physical displays, while using existing hardware, along with the ability of invoking different monitor configurations in response to a received input.

In one or more embodiments, where the user is using or wearing a head-mounted display and can only see virtual content, the assistance platform is capable of providing assistive content by spreading the assistive content across multiple virtual displays and/or monitors to supplement the user's interaction with other virtual content. A virtual monitor can take the form of any appropriate virtual object, e.g., be presented or displayed graphically, rather than necessarily appearing similar to real-world displays.

In one or more embodiments, in the case of a device and/or system with an augmented reality display, the device is capable of displaying general assistance, application-specific assistance, and/or application-content-specific assistance as one or more virtual overlays. The virtual overlays that are displayed supplement the user's interaction with a real-world device, display, or regular object. In particular embodiments, a device and/or system is capable of providing a virtual overlay including one or more of general assistance, application-specific assistance, and/or application-content-specific assistance overlays with which a user may interact while concurrently providing or displaying one or more of general assistance, application-specific assistance, and/or application-content-specific-assistance on one or more other real-world displays and/or within one or more other virtual overlays displayed on such other real-world displays.

In particular embodiments, in the case of augmented reality systems, the assistance manager is capable of providing assistive content, e.g., general assistance, application-specific assistance, and/or application-content-specific assistance, on one or more real world devices to provide assistance with content that is displayed on one or more virtual displays.

In one or more embodiments where multiple different and independent devices are used, the assistance platform is capable of distributing tasks (e.g., shortcuts or data items of assistance) and/or types of assistance across the various, different devices. In particular embodiments, the assistance platform is capable of providing one or more interface controls that, when activated via a user input, are operative to transfer one or more shortcuts or items of assistance information and/or entirely assistance overlays across devices and/or displays. For example, if a shortcut and/or assistance overlay is currently displayed on a first display and/or a first device, in response to activation of a particular interface control, the assistance platform is capable of stopping the display of that particular shortcut and/or assistance overlay on the first display and/or first device and begin displaying the shortcut and/or assistance overlay on a second display and/or second device. In particular embodiments, the assistance platform is capable of receiving user inputs that select the particular shortcuts and/or assistance overlays that are to be moved. In particular embodiments, the assistance platform is also capable of receiving user inputs selecting the particular display and/or device to which particular shortcut(s) and/or assistance overlays are to be moved in cases where more than two displays and/or two devices are used.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product refers to an article of manufacture, e.g., a device or a system. A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for providing assistance using a device, comprising:
   in response to determining a first context of the device indicating that a home screen of the device is displayed in lieu of an application, displaying general assistance on the device;
   in response to a second context of the device indicating that the application is currently executing and displayed by the device, determining, using a processor of the device, that content is loaded into the application, wherein the second context is subsequent to the first context;
   in response to determining that the application is currently executing and displayed and that content is loaded into the application, performing a semantic analysis of the content that detects a named entity in the content;
   in response to detecting the named entity, determining one or more selected actions capable of receiving, as input, an object type corresponding to the named entity, wherein the selected actions are determined based on a registration of actions and corresponding applications; and
   displaying application-content-specific assistance as one or more shortcuts corresponding to the one or more selected actions;
   wherein the application is displayed on a first display of the device and the application-content-specific assistance is displayed on a second display of the device concurrently with the application displayed on the first display;
   wherein the general assistance is displayed as a first overlay and the application-content-specific assistance is displayed as a second overlay that is superimposed over the first overlay; and
   wherein, in response to received user inputs, the device navigates between the second overlay and the first overlay.

2. The method of claim 1, further comprising:
   displaying application-specific assistance in response to determining a third context wherein no content is loaded into the application.

3. The method of claim 1, further comprising:
   determining an object type the application receives as input; and
   providing a selected shortcut included in the one or more shortcuts, wherein the selected shortcut is configured to provide an object of the determined object type to the application.

4. The method of claim 1, wherein the first overlay is initially generated and displayed while the first display shows the home screen and the second overlay is generated and shown in response to the application being launched and displayed.

5. The method of claim 1, wherein the first display of the device is configured to display the application executing, the second display is configured to display the application-content-specific assistance, and a third display is configured to display a type of user assistance that is different from the application-content-specific assistance displayed on the second display.

6. The method of claim 1, wherein the application-content-specific assistance is displayed based on application-specific preferences defining a type of assistance to be provided for the application.

7. The method of claim 1, wherein the application-content-specific assistance is generated based on a semantic analysis of text or images displayed by the application.

8. The method of claim 1, wherein the first context includes at least one of a particular location of the device or a current time.

9. A system, comprising:
a memory configured to store instructions;
a first display;
a second display; and
a processor coupled to the memory, the first display and the second display, wherein the processor, in response to executing the instructions, is configured to initiate operations for providing assistance including:
in response to determining a first context of the system indicating that a home screen of the system is displayed on the first display in lieu of an application, displaying general assistance on the system;
in response to a second context of the system indicating the application is currently executing and displayed by the first display, determining that content is loaded into the application, wherein the second context is subsequent to the first context;
in response to determining that the application is currently executing and displayed and that content is loaded into the application, performing a semantic analysis of the content that detects a named entity in the content;
in response to detecting the named entity, determining one or more selected actions capable of receiving, as input, an object type corresponding to the named entity, wherein the selected actions are determined based on a registration of actions and corresponding applications; and
displaying application-content-specific assistance as one or more shortcuts corresponding to the one or more selected actions;
wherein the application-content-specific assistance is displayed on the second display of the system concurrently with the application displayed on the first display;
wherein the general assistance is displayed as a first overlay and the application-content-specific assistance is displayed as a second overlay that is superimposed over the first overlay; and
wherein, in response to received user inputs, the system navigates between the second overlay and the first overlay.

10. The system of claim 9, wherein the processor is configured to initiate operations comprising:
displaying application-specific assistance in response to determining a third context wherein no content is loaded into the application.

11. The system of claim 9, wherein the processor is configured to initiate operations comprising:
determining an object type the application receives as input; and
providing a selected shortcut included in the one or more shortcuts, wherein the selected shortcut is configured to provide an object of the determined object type to the application.

12. The system of claim 9, wherein the first overlay is initially generated and displayed while the first display shows the home screen and the second overlay is generated and shown in response to the application being launched and displayed.

13. The system of claim 9, further comprising:
a third display coupled to the processor and configured to display a type of user assistance that is different from the application-content-specific assistance displayed on the second display.

14. The system of claim 9, wherein the application-content-specific assistance is displayed based on application-specific preferences defining a type of assistance to be provided for the application.

15. The system of claim 9, wherein the application-content-specific assistance is generated based on a semantic analysis of text or images displayed by the application.

16. The system of claim 9, wherein the first context includes at least one of a particular location of the system or a current time.

17. A computer program product comprising a computer readable storage medium having program code stored thereon for providing assistance, the program code executable by a processor of a device to perform operations comprising:
in response to determining a first context of the device indicating that a home screen of the device is displayed in lieu of an application, displaying general assistance on the device;
in response to a second context of the device indicating the application is currently executing and displayed by the device, determining that content is loaded into the application, wherein the second context is subsequent to the first context;
in response to determining that the application is currently executing and displayed and that content is loaded into the application, performing a semantic analysis of the content that detects a named entity in the content;
in response to detecting the named entity, determining one or more selected actions capable of receiving, as input, an object type corresponding to the named entity, wherein the selected actions are determined based on a registration of actions and corresponding applications; and
displaying application-content-specific assistance as one or more shortcuts corresponding to the one or more selected actions;
wherein the application is displayed on a first display of the device and the application-content-specific assistance is displayed on a second display of the device concurrently with the application displayed on the first display;
wherein the general assistance is displayed as a first overlay and the application-content-specific assistance is displayed as a second overlay that is superimposed over the first overlay; and
wherein, in response to received user inputs, the device navigates between the second overlay and the first overlay.

18. The computer program product of claim 17, wherein the program code is executable by the processor to perform operations comprising:
displaying application-specific assistance in response to determining a third context wherein no content is loaded into the application.

19. The computer program product of claim 17, wherein the program code is executable by the processor to perform operations comprising:
determining an object type the application receives as input; and providing a selected shortcut included in the one or more shortcuts, wherein the selected shortcut is configured to provide an object of the determined object type to the application.

20. The computer program product of claim 17, wherein the first overlay is initially generated and displayed while the first display shows the home screen and the second overlay is generated and shown in response to the application being launched and displayed.

21. The computer program product of claim 17, wherein a third display is configured to display a type of user assistance that is different from the application-content-specific assistance displayed on the second display.

22. The computer program product of claim 21, wherein the application-content-specific assistance is displayed based on application-specific preferences defining a type of assistance to be provided for the application.

23. The computer program product of claim 17, where the application-content-specific assistance is displayed based on application-specific preferences defining a type of assistance to be provided for the application.

24. The computer program product of claim 17, wherein the first context includes at least one of a particular location of the device or a current time.

\* \* \* \* \*